United States Patent
Tanabe et al.

(10) Patent No.: US 10,604,102 B2
(45) Date of Patent: Mar. 31, 2020

(54) SIDE AIR BAG DEVICE

(71) Applicant: TS TECH CO., LTD., Asaka-shi, Saitama (JP)

(72) Inventors: Jinichi Tanabe, Tochigi (JP); Kazuhiro Hayashi, Tochigi (JP)

(73) Assignee: TS Tech Co., Ltd., Saitama (JP)

( * ) Notice: Subject to any disclaimer, the term of this patent is extended or adjusted under 35 U.S.C. 154(b) by 0 days.

(21) Appl. No.: 15/704,342

(22) Filed: Sep. 14, 2017

(65) Prior Publication Data
US 2018/0001859 A1   Jan. 4, 2018

Related U.S. Application Data

(62) Division of application No. 15/325,909, filed as application No. PCT/JP2015/070087 on Jul. 13, 2015, now Pat. No. 10,059,297.

(30) Foreign Application Priority Data

Jul. 14, 2014 (JP) ................. 2014-144488

(51) Int. Cl.
   *B60R 21/217*   (2011.01)
   *B60R 21/207*   (2006.01)
   (Continued)

(52) U.S. Cl.
   CPC .......... *B60R 21/217* (2013.01); *B60R 21/017* (2013.01); *B60R 21/207* (2013.01);
   (Continued)

(58) Field of Classification Search
   CPC .......... B60R 21/217; B60R 2021/2078; B60R 21/23138; B60R 21/017; B60R 21/2171;
   (Continued)

(56) References Cited

U.S. PATENT DOCUMENTS 5,257,815 A   11/1993  Bachelder et al.
5,501,484 A * 3/1996  Saderholm ............ B60R 21/217
                                          280/728.2
(Continued)

FOREIGN PATENT DOCUMENTS

JP   2000-016219 A   1/2000
JP   2009-040328 A   2/2009
(Continued)

OTHER PUBLICATIONS

Extended European Search Report issued in related application EP 15821291.0, dated Jun. 7, 2017, 8 pages.
(Continued)

*Primary Examiner* — Paul N Dickson
*Assistant Examiner* — Timothy Wilhelm
(74) *Attorney, Agent, or Firm* — Faegre Drinker Biddle & Reath LLP

(57) ABSTRACT

A side air bag device is described which is disposed in a space between a vehicle body and a back seat and for which rigidity of attachment to a vehicle body member is improved. The side air bag device provided between a vehicle body and a back seat includes: a base member including a base storage configured to store an air bag and an inflator and a base attachment portion attached to the vehicle body; and a retainer member configured to hold the base storage from a vehicle back side. The retainer member extends from a portion holding the base storage while being bent along the shape of the vehicle body. The retainer member is attached to the vehicle body together with the base attachment portion while being overlapped with the base attachment portion.

20 Claims, 17 Drawing Sheets

(51) Int. Cl.
  *B60R 21/017* (2006.01)
  *B60R 21/215* (2011.01)
  *B60R 21/231* (2011.01)
  *B60R 21/2334* (2011.01)
  *B60R 21/26* (2011.01)

(52) U.S. Cl.
  CPC ........ B60R 21/215 (2013.01); B60R 21/2171 (2013.01); B60R 21/2334 (2013.01); B60R 21/23138 (2013.01); B60R 21/26 (2013.01); *B60R 2021/2078* (2013.01); *B60R 2021/2172* (2013.01); *B60R 2021/23153* (2013.01)

(58) Field of Classification Search
  CPC ........ B60R 21/207; B60R 2021/23153; B60R 2021/2172; B60R 21/2334; B60R 21/26; B60R 21/215
  See application file for complete search history.

(56) References Cited

U.S. PATENT DOCUMENTS

| | | | | |
|---|---|---|---|---|
| 5,564,735 | A * | 10/1996 | Boy | B60R 21/21 280/730.2 |
| 5,601,332 | A * | 2/1997 | Schultz | B60N 2/4235 280/728.3 |
| 5,687,987 | A * | 11/1997 | Spencer | B60R 21/207 280/728.2 |
| 5,890,733 | A * | 4/1999 | Dillon | B60R 21/20 280/728.2 |
| 5,911,434 | A * | 6/1999 | Townsend | B60J 5/06 280/728.2 |
| 5,947,630 | A * | 9/1999 | Dillon | B60R 21/20 280/728.2 |
| 5,967,547 | A * | 10/1999 | Narita | B60R 21/207 280/728.2 |
| 5,992,878 | A * | 11/1999 | Narita | B60R 21/207 280/728.2 |
| 6,007,089 | A * | 12/1999 | Gotz | B60R 21/21 280/728.3 |
| 6,092,832 | A * | 7/2000 | Worrell | B60R 21/2035 280/728.2 |
| 6,126,192 | A * | 10/2000 | Enders | B60R 21/2176 280/728.2 |
| 6,237,936 | B1 * | 5/2001 | Quade | B60R 21/207 280/728.2 |
| 6,402,240 | B1 * | 6/2002 | Toba | B60N 2/002 297/217.3 |
| 6,457,741 | B2 | 10/2002 | Seki et al. | |
| 6,857,655 | B2 * | 2/2005 | Muller | B60R 21/2155 280/728.3 |
| 6,976,700 | B2 * | 12/2005 | McCann | B60R 21/2171 280/728.2 |
| 7,048,297 | B2 * | 5/2006 | Schneider | B60R 21/217 280/728.2 |
| 7,204,510 | B2 * | 4/2007 | Bossenmaier | B60R 21/20 280/728.3 |
| 7,267,363 | B2 * | 9/2007 | Tredez | B60R 21/207 280/728.3 |
| 7,370,879 | B2 * | 5/2008 | Hotta | B60R 21/206 280/728.2 |
| 7,604,250 | B2 * | 10/2009 | Hotta | B60R 21/206 280/728.2 |
| 7,654,555 | B2 * | 2/2010 | Schaupp | B60R 21/2171 280/728.2 |
| 7,654,556 | B2 * | 2/2010 | Vigeant | B60R 21/201 280/728.2 |
| 7,661,697 | B2 * | 2/2010 | Itoga | B60R 21/18 280/728.2 |
| 7,669,888 | B2 * | 3/2010 | Sato | B60R 21/207 280/730.2 |
| 7,677,594 | B2 * | 3/2010 | Hazlewood | B60N 2/5883 280/728.2 |
| 7,699,340 | B2 * | 4/2010 | Okuhara | B60R 21/2171 280/728.2 |
| 7,753,407 | B2 * | 7/2010 | Yokota | B60R 21/20 280/728.2 |
| 7,798,519 | B2 * | 9/2010 | Kawabe | B60R 21/207 280/728.3 |
| 7,850,196 | B2 * | 12/2010 | Kashiwagi | B60R 21/2171 280/728.1 |
| 7,905,307 | B2 * | 3/2011 | Kubota | B60K 1/04 165/202 |
| 7,938,436 | B2 * | 5/2011 | Lunt | B60R 21/2171 280/728.2 |
| 8,123,246 | B2 * | 2/2012 | Gilbert | B60R 21/207 280/728.2 |
| 8,146,942 | B2 * | 4/2012 | Bruning | B60R 21/205 280/728.2 |
| 8,172,257 | B2 * | 5/2012 | Wandtke | B60R 21/21 280/728.2 |
| 8,196,954 | B2 * | 6/2012 | Choi | B60R 21/2176 280/728.3 |
| 8,226,113 | B2 * | 7/2012 | Yamashita | B60R 21/207 280/728.2 |
| 8,316,516 | B2 * | 11/2012 | Hoehe | A44B 18/0007 24/452 |
| 8,454,050 | B2 * | 6/2013 | Schorle | B60R 21/217 280/728.2 |
| 8,528,934 | B2 * | 9/2013 | Kobayshi | B60R 21/207 280/729 |
| 8,534,701 | B2 * | 9/2013 | Sosnowski | B60R 21/20 180/65.21 |
| 8,596,674 | B2 * | 12/2013 | Fukawatase | B60R 21/207 280/728.2 |
| 8,651,518 | B2 * | 2/2014 | Shamoto | B60N 2/289 280/730.2 |
| 8,662,531 | B2 * | 3/2014 | Tracht | B60R 21/207 280/730.2 |
| 8,684,399 | B2 * | 4/2014 | Honda | B60R 21/2171 280/728.2 |
| 8,733,832 | B2 * | 5/2014 | Fukawatase | B60N 2/42 297/216.1 |
| 8,746,732 | B1 * | 6/2014 | Kutchey | B60R 21/206 280/728.2 |
| 8,752,861 | B2 * | 6/2014 | Fukawatase | B60N 2/289 280/728.2 |
| 8,764,049 | B2 * | 7/2014 | Lusk | B60R 21/207 280/728.2 |
| 8,807,591 | B2 * | 8/2014 | Nakata | B60R 21/207 280/728.3 |
| 8,955,877 | B2 * | 2/2015 | Broussard | B60R 21/206 280/728.2 |
| 9,022,415 | B2 * | 5/2015 | Kim | B60R 21/215 280/728.1 |
| 9,278,662 | B2 * | 3/2016 | Hotta | B60R 21/2171 |
| 9,296,352 | B2 * | 3/2016 | Fujiwara | B60R 21/207 |
| 9,415,739 | B2 * | 8/2016 | Mihm | B60R 21/207 |
| 9,545,891 | B2 * | 1/2017 | Tanabe | B60N 2/68 |
| 9,598,040 | B2 * | 3/2017 | Tanabe | B60R 21/207 |
| 9,616,791 | B2 * | 4/2017 | Awata | B60N 2/5825 |
| 9,630,584 | B2 * | 4/2017 | Fujiwara | B60R 21/2171 |
| 2002/0084630 | A1 * | 7/2002 | Aulbach | B60R 21/207 280/728.2 |
| 2004/0239080 | A1 * | 12/2004 | Berrahou | B60R 21/203 280/728.2 |
| 2005/0029784 | A1 * | 2/2005 | Siegel | B60R 21/26 280/736 |
| 2006/0006630 | A1 * | 1/2006 | Schwarz | B60R 21/2171 280/728.2 |
| 2006/0061073 | A1 * | 3/2006 | Naruse | B60R 21/21 280/730.2 |
| 2007/0182131 | A1 * | 8/2007 | Helbig | B60R 21/2165 280/728.2 |
| 2008/0007035 | A1 * | 1/2008 | Acker | B60R 21/233 280/742 |
| 2008/0084051 | A1 * | 4/2008 | Okuhara | B60R 21/2171 280/728.2 |
| 2009/0039623 | A1 | 2/2009 | Kawabe et al. | |

(56) References Cited

U.S. PATENT DOCUMENTS

| | | | |
|---|---|---|---|
| 2009/0039627 A1* | 2/2009 | Yokota | B60R 21/201 280/730.2 |
| 2009/0152838 A1* | 6/2009 | Robins | B60R 21/2171 280/728.2 |
| 2010/0181746 A1* | 7/2010 | Rose | B60R 21/2171 280/736 |
| 2013/0175792 A1 | 7/2013 | Fukawatase et al. | |
| 2014/0197621 A1* | 7/2014 | Thomas | B60R 21/207 280/730.2 |
| 2015/0076802 A1* | 3/2015 | Tanabe | B60N 2/68 280/730.2 |
| 2015/0151711 A1* | 6/2015 | Fujiwara | B60R 21/207 280/728.2 |
| 2016/0009247 A1* | 1/2016 | Fujiwara | B60R 21/2171 280/728.2 |
| 2016/0009248 A1* | 1/2016 | Tanabe | B60R 21/276 280/728.2 |
| 2016/0288838 A1* | 10/2016 | Kindaichi | B62D 21/157 |
| 2017/0066402 A1* | 3/2017 | Fujiwara | B60R 21/231 |

FOREIGN PATENT DOCUMENTS

| | | |
|---|---|---|
| JP | 2013-154456 A | 8/2013 |
| WO | 2012/035619 A1 | 3/2012 |

OTHER PUBLICATIONS

Final Office Action issued in related U.S. Appl. No. 15/704,469, dated Jun. 1, 2018, 8 pages.

Final Office Action issued in related U.S. Appl. No. 15/704,593, dated Jun. 1, 2018, 9 pages.

Office Action issued in related application JP 2017-224675, dated Apr. 16, 2019, with machine generated English language translation, 11 pages.

* cited by examiner

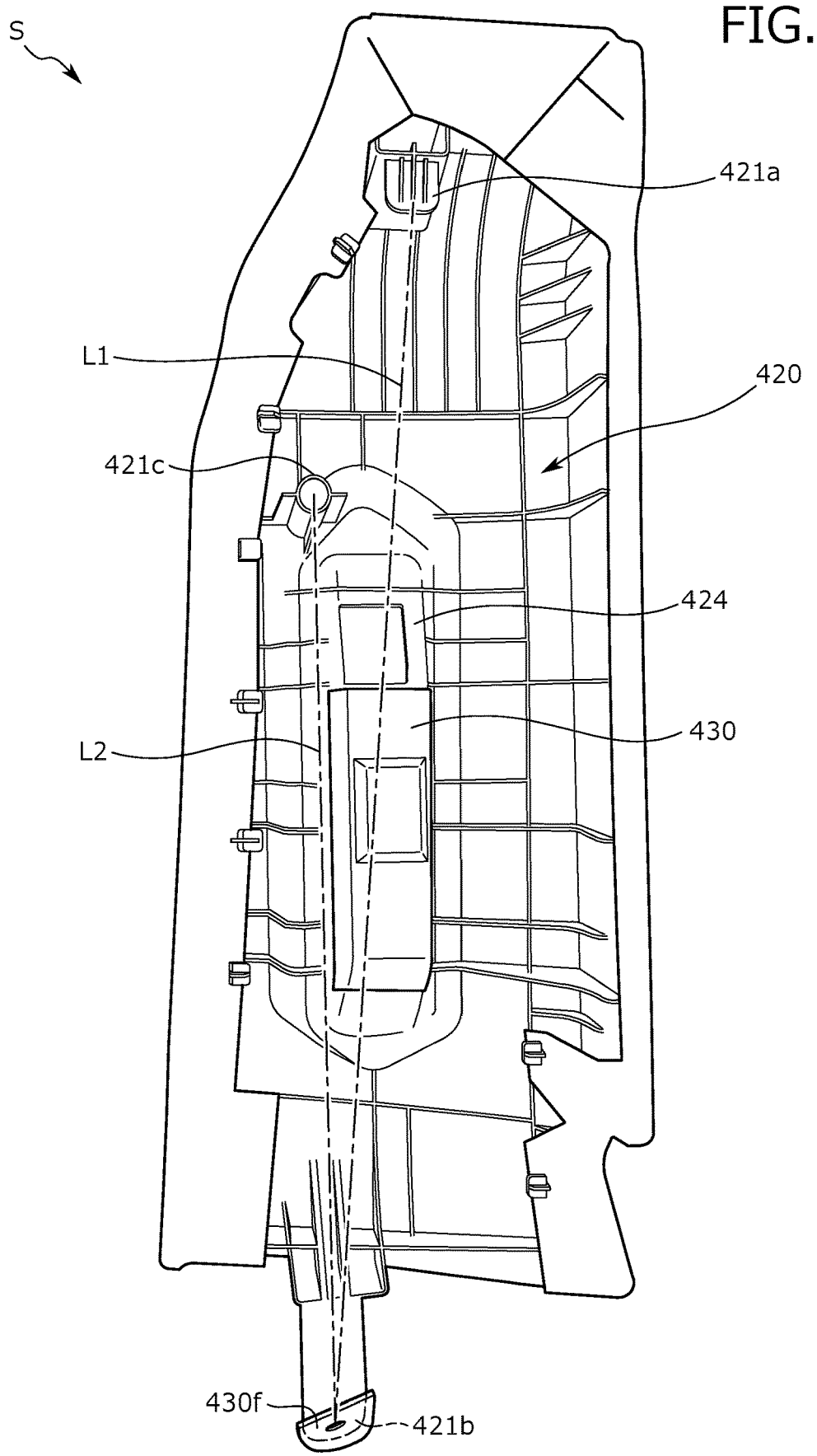

SIDE AIR BAG DEVICE

CROSS REFERENCE TO RELATED APPLICATIONS

This application is a divisional of U.S. patent application Ser. No. 15/325,909, filed on Jan. 12, 2017, which is a National Stage Entry application of PCT Application No. PCT/JP2015/070087, filed Jul. 13, 2015, which claims the priority benefit of Japanese Patent Application No. JP2014-144488, filed Jul. 14, 2014, the contents of all being incorporated herein by reference.

BACKGROUND

The present disclosure relates to a side air bag device configured to absorb impact applied from a vehicle lateral side, and particularly relates to a side air bag device disposed between a vehicle body and a back seat.

Conventionally, a device including an inflator configured to inject gas into an air bag, a storage box provided with an opening on a vehicle front side and configured to store the air bag and the inflator, and a resin base cover configured to cover the storage box from the vehicle front side has been known as a side air bag device disposed between a vehicle body door and a back seat in a vehicle width direction (see, e.g., Japanese Patent Publication JP 2009-040328A).

In the side air bag device described in Japanese Patent Publication JP 2009-040328A, when the air bag stored in the resin storage box is expanded by the inflator, the air bag breaks a thin portion of the resin base cover on the vehicle front side and therefore expands and deploys. Specifically, a vehicle battery provided on a vehicle body and the inflator are connected together via a harness. When an impact equal to or greater than a predetermined value is applied from a vehicle lateral side, an impact sensor (not shown) detects such impact, and ignition electric power is supplied to the inflator. Then, the air bag expands and deploys at the side of a seated passenger. In this case, the air bag and the inflator are stored in the storage box with these components being held by a metal retainer. Thus, retention of the air bag and the inflator can be ensured, and the air bag can be guided in an expansion and deployment direction.

In the side air bag device of Japanese Patent Publication JP 2009-040328A, the above-described resin base cover is disposed and fitted into a space between the vehicle body and the back seat, and the base cover is typically fixed with upper and lower end portions thereof being assembled with a vehicle body member. However, in driving of a vehicle, e.g., vibrations of the vehicle body and impacts received from a seated passenger are transmitted to the side air bag device. Thus, for stable attachment of the side air bag device on the vehicle body, design needs to be made to improve rigidity of attachment between the resin base cover and the vehicle body member. Particularly in the case of the side air bag device disposed in the space between the vehicle body and the back seat, the process of attaching components in a narrow space needs to be performed, and for this reason, design needs to be made to utilize existing components to ensure attachment rigidity of the side air bag device.

Moreover, in the side air bag device of Japanese Patent Publication JP 2009-040328A, the inflator is stored in the storage box on a vehicle back side of the base cover, and therefore, the harness extends in a relatively-complicated pattern from the vehicle battery toward the inflator stored in the storage box. However, in the above-described side air bag device, no arrangement is made to support the harness on the base cover and the storage box as components of the side air bag device. Therefore, when the harness freely moves around, for example, under vibrations received from the seated passenger and vibrations of the vehicle body, the harness may come into contact with the air bag at the time of expansion and deployment, therefore affecting the deployment of the air bag. Moreover, in driving of the vehicle, the harness may be caught by other components, leading to deformation of the harness. Particularly in the case of the side air bag device disposed in the space between the vehicle body and the back seat, the process of attaching the components in the narrow space needs to be performed, and for this reason, the harness needs to be compactly disposed.

Further, in the side air bag device of Japanese Patent Publication JP 2009-040328A, when the inflator operates to expand the air bag, a large gas pressure of the inflator allowing the air bag to expand is loaded to the storage box, and as a result, the storage box deforms. This may affect the expansion direction of the air bag. Therefore, the technique of improving, at the time of expansion and deployment of the air bag, rigidity of the periphery of the storage box storing the air bag and the inflator has been demanded. Particularly in the above-described prior art, the storage box of the side air bag device is made of metal for strength improvement, but on the other hand, it has been desired to make the storage box from resin for the purpose of weight reduction. Thus, even if the material of the storage box is changed to resin, the technique of reducing deformation of the storage box at the time of expansion and deployment of the air bag has been desired.

In addition, since the side air bag device of Japanese Patent Publication JP 2009-040328A is assembled and fitted into a space between the vehicle body door and the back seat, e.g., vibration of the vehicle body and impact received from the seated passenger are transmitted to the side air bag device in driving of the vehicle. Thus, a design is desired that reduces contact noise between the vehicle body and the side air bag device.

SUMMARY

The present disclosure has been made in view of the foregoing problems, and describes various embodiments of a side air bag device which is disposed in a space between a vehicle body and a back seat and for which rigidity of attachment to a vehicle body member is improved. Moreover, the present disclosure further describes embodiments of a side air bag device for which existing components are utilized to ensure rigidity of attachment to a vehicle body member. In addition, the present disclosure still further describes an embodiment of a side air bag device which can suitably support a harness on components. Moreover, the present disclosure still further describes an embodiment of a side air bag device disposed in a space between a vehicle body and a back seat such that a harness is compactly disposed. In addition, the present disclosure still further describes an embodiment of a side air bag device which can reduce deformation of the periphery of a storage box storing an air bag and an inflator and stabilizing an expansion direction of the air bag. Further, the present disclosure still further describes an embodiment of a side air bag device which can reduce, in driving of a vehicle, contact noises between a vehicle body and the side air bag device.

According to an embodiment of the side air bag device of the present disclosure, the above-described problems are solved by a side air bag device provided between a vehicle body and a back seat, the side air bag device including: an expandable air bag; an inflator configured to supply gas into the air bag a base member including a base storage configured to store the air bag in a folded state and the inflator and a base attachment portion attached to the vehicle body, the base member being attached between a vehicle body door and the back seat; and a retainer member configured to hold the base storage from a vehicle back side. The retainer member extends from a portion holding the base storage toward the base attachment portion, and the retainer member is attached to the vehicle body together with the base attachment portion while being overlapped with the base attachment portion.

With the above-described configuration, the base attachment portion of the base member, serving as a base plate of the side air bag device, is attached to the vehicle body together with the retainer member while being overlapped with the relatively-high rigidity retainer member. Thus, rigidity of attachment of the side air bag device to a vehicle body member is improved. Moreover, with the above-described configuration, the retainer member as an existing component can be utilized to ensure rigidity of attachment of the side air bag device to the vehicle body member.

In the above-described state, a portion of the retainer member overlapped with the base member may extend from the base attachment portion toward the base storage. With the above-described configuration, the portion where the retainer member and the base member overlap each other is large, and therefore, rigidity of attachment of the side air bag device to the vehicle body member is further improved.

In the above-described state, the retainer member may be provided with a deflecting portion bent along the shape of the vehicle body, the deflecting portion being formed between an upper end portion holding the base storage and a lower end portion overlapped with the base attachment portion. With the above-described configuration, the side air bag device can be attached along the shape of the vehicle body. As a result, contact among these components can be inhibited, therefore increasing support rigidity.

In the above-described state, the base storage and the retainer member may respectively include holes communicating with each other in a state where the base storage and the retainer member are assembled to each other. An assembled portion for assembly of the inflator to the base storage and the retainer member may be provided at a portion of the inflator which faces the holes. An assembly member may be assembled to the assembled portion from an opposite side of the retainer hole from the base hole. With the above-described configuration, the inflator is, at a time, assembled to the base storage and the retainer member by the assembly member from the opposite side of the retainer member relative to the inflator. Thus, attachment rigidity of the inflator and the air bag is improved, and the attachment process is facilitated.

In the above-described state, a peripheral edge portion of the retainer hole of the retainer member may be provided with a fitting recess which is formed recessed toward the inflator and into which the assembly member is fitted. With the above-described configuration, the inflator can be compactly assembled to the base storage and the retainer member without protrusion of the assembly member. Moreover, the assembly member can be assembled into the relatively-high rigidity fitting recess.

In the above-described state, the fitting recess of the retainer member may be narrowed in a tapered shape from an opening toward a bottom portion. With the above-described configuration, the assembly member is easily assembled into the fitting recess, and the center of the assembly member is easily aligned with the center of the fitting recess.

In the above-described state, the retainer member may be assembled with the base member such that the fitting recess is fitted into the base hole. With the above-described configuration, assembly rigidity of the base member and the retainer member is improved.

In the above-described state, the assembled portion of the inflator may include an assembly shaft protruding toward the retainer member. The retainer member may include: a back wall portion disposed on the vehicle back side of the base storage; and right and left side wall portions that extend from both end portions of the back wall portion in a vehicle width direction toward a vehicle front side. At least one of the side wall portions may be provided with the retainer hole and a slit which is a continuous cut from the retainer hole toward the vehicle front side and into which the assembly shaft is inserted. With the above-described configuration, for example, when the retainer member is assembled to the base storage from the vehicle back side, contact between the retainer member and the assembly shaft of the inflator exposed from the base hole of the base storage can be inhibited, and the process of assembling the retainer member is facilitated.

In the above-described state, the side air bag device may further include a skin material configured to cover the base member from the vehicle front side, the base member storing the air bag and the inflator; and a webbing having one end portion attached to the skin material and the other end portion that extend from the one end portion and are locked to a webbing lock portion provided at the base storage, the webbing being configured to guide the air bag in an expansion direction. A reinforcement portion may be formed on a portion of the retainer member, which holds the webbing lock portion, the reinforcement portion being located on one surface of the retainer member, which is on an opposite side from the other surface of the retainer member to which the webbing is attached. With the above-described configuration, support rigidity of the webbing is improved. Thus, even if a relatively-strong force is applied to the webbing when the air bag expands and deploys, the air bag can be stably guided without detachment of the webbing.

In the above-described state, the side air bag device may further include a harness having one end portion connected to the inflator and configured to supply ignition electric power to the inflator. The harness may extend in an up-to-down direction while being supported on the base member. With the above-described configuration, the side air bag device that enables the harness to be suitably supported on the base member as a component of the side air bag device. Moreover, the harness extends in the up-to-down direction while being supported on the base member. Thus, in the side air bag device disposed in a space between the vehicle body and the back seat, the harness connecting between a vehicle battery provided below the feet of a seated passenger and the air bag and the inflator arranged at the side of the body of the seated passenger can be compactly arranged.

In the above-described state, the harness extending in the up-to-down direction may be sandwiched between the base storage and the retainer member so as to be supported therebetween. As described above, the harness extending in the up-to-down direction is sandwiched between the base storage and the retainer member. Thus, the harness can be suitably supported, and the harness can be inhibited from freely moving for example, under vibrations received from the seated passenger and vibrations of the vehicle body.

In the above-described state, the base storage may be provided with a housing recess which is formed recessed toward an opposite side from the retainer member and in which the harness is housed, and the harness may be supported and surrounded by the housing recess and the retainer member. With the above-described configuration, the harness can be suitably supported and can be compactly arranged.

In the above-described state, a protrusion protruding toward a portion of the vehicle body on the vehicle back side is provided at the retainer member to be located therefrom on the vehicle back side. When the air bag expands and deploys, the protrusion may be disposed in contact with the portion of the vehicle body. With the above-described configuration, the retainer member for protecting the base storage can be restricted from tilting toward the vehicle back side at the time of expansion and deployment of the air bag. That is, rigidity of support of the retainer member for the base storage is enhanced. Thus, deformation of the periphery of the base storage at the time of expansion and deployment of the air bag can be reduced, and the air bag can be stably deployed in the expansion and deployment direction. Moreover, a back surface of the retainer member partially protrudes to contact a portion of the vehicle body. Thus, a space in a vehicle front-to-back direction can be ensured at portions other than the protrusion. Further, when the air bag expands and deploys, the protrusion is disposed to contact a portion of the vehicle body. Thus, in driving of a vehicle, contact noises between the vehicle body and the side air bag device can be reduced.

In the above-described state, the retainer member may include: a back wall portion disposed on the vehicle back side of the base storage; and right and left side wall portions extending from both end portions of the back wall portion in a vehicle width direction toward the vehicle front side. The protrusion may be formed such that at least a portion of the back wall portion is recessed toward the vehicle back side. With the above-described configuration, support rigidity of the retainer member can be improved with a simple structure, and tilting of the retainer member toward the vehicle back side at the time of expansion and deployment of the air bag can be restricted.

In the above-described state, the base storage and the retainer member may respectively include holes into which an assembly shaft provided at the inflator is inserted, the holes communicating with each other. An assembly member may be assembled to the assembly shaft from an opposite side of the holes from the inflator. The assembly shaft may include at least a first assembly shaft provided on an upper end side of the inflator and a second assembly shaft provided on a lower end side of the inflator. The protrusion may be disposed between an upper end of the first assembly shaft and a lower end of the second assembly shaft. As described above, the protrusion of the retainer member can be disposed between the first and second assembly members of the inflator in the up-to-down direction to contact the vehicle body member. Thus, the retainer member can efficiently receive a reactive force generated when the air bag expands and deploys toward the vehicle front side.

According to an embodiment, the base attachment portion is attached to the vehicle body together with the retainer member while being overlapped with the relatively-high rigidity retainer member. Thus, rigidity of attachment of the side air bag device to the vehicle body member is improved. Moreover, the retainer member as the existing component can be utilized to ensure rigidity of attachment of the side air bag device to the vehicle body member. According to an embodiment, the portion where the retainer member and the base member overlap each other is large, and therefore, rigidity of attachment of the side air bag device to the vehicle body member is further improved. According to an embodiment, the side air bag device can be attached along the shape of the vehicle body. As a result, contact among these components can be inhibited, therefore improving support rigidity. According to an embodiment, attachment rigidity of the inflator and the air bag is improved, and the attachment process is facilitated.

According to an embodiment, the inflator can be compactly assembled to the base storage and the retainer member without protrusion of the assembly member. Moreover, the assembly member can be assembled into the relatively-high rigidity fitting recess. According to an embodiment, the assembly member is easily assembled into the fitting recess, and the center of the assembly member is easily aligned with the center of the fitting recess. According to an embodiment, assembly rigidity of the base member and the retainer member is improved. According to an embodiment, for example, when the retainer member is assembled to the base storage from the vehicle back side, contact between the assembly shaft of the inflator and the retainer member can be inhibited, and the process of assembling the retainer member is facilitated. According to an embodiment, support rigidity of the webbing is improved. Thus, even if a relatively strong force is applied to the webbing when the air bag expands and deploys, the air bag can be stably guided without detachment of the webbing.

According to an embodiment, the harness can be suitably supported on the base member as the component of the side air bag device. Moreover, the harness can be compactly disposed. According to an embodiment, the harness can be suitably supported, and the harness can be restricted from freely moving, for example, under vibrations received from the seated passenger and vibrations of the vehicle body. According to an embodiment, the harness can be suitably supported and can be compactly arranged.

According to an embodiment, the retainer member for protecting the base storage can be restricted from tilting toward the vehicle back side at the time of expansion and deployment of the air bag. That is, deformation of the periphery of the base storage at the time of expansion and deployment of the air bag can be inhibited, and air bag can stably deploy in the expansion and deployment direction. The space in the vehicle front-to-back direction can be ensured at portions other than the protrusion in the retainer member. Further, in driving of the vehicle, contact noises between the vehicle body and the side air bag device can be reduced. According to an embodiment, support rigidity of the retainer member can be improved with the simple structure, and tilting of the retainer member toward the vehicle back side at the time of expansion and deployment of the air bag can be restricted. According to an embodiment, the retainer member can efficiently receive reactive force generated when the air bag expands and deploys toward the vehicle front side.

BRIEF DESCRIPTION OF DRAWINGS

FIG. 17 is a back view of a modified example of the side air bag device, according to an embodiment.

DETAILED DESCRIPTION

Various embodiments of side air bag devices of the present disclosure are described below with reference to FIGS. 1 to 17. The present disclosure relates to a side air bag device provided between a vehicle body and a back seat of a vehicle. The side air bag device includes: a base member including a base storage configured to store an air bag and an inflator and a base attachment portion attached to the vehicle body; and a retainer member configured to hold the base storage from a vehicle back side. The retainer member extends from a portion holding the base storage while being bent along the shape of the vehicle body. The retainer member is overlapped with the base attachment portion and attached to the vehicle body together with the base attachment portion.

Figure 1:
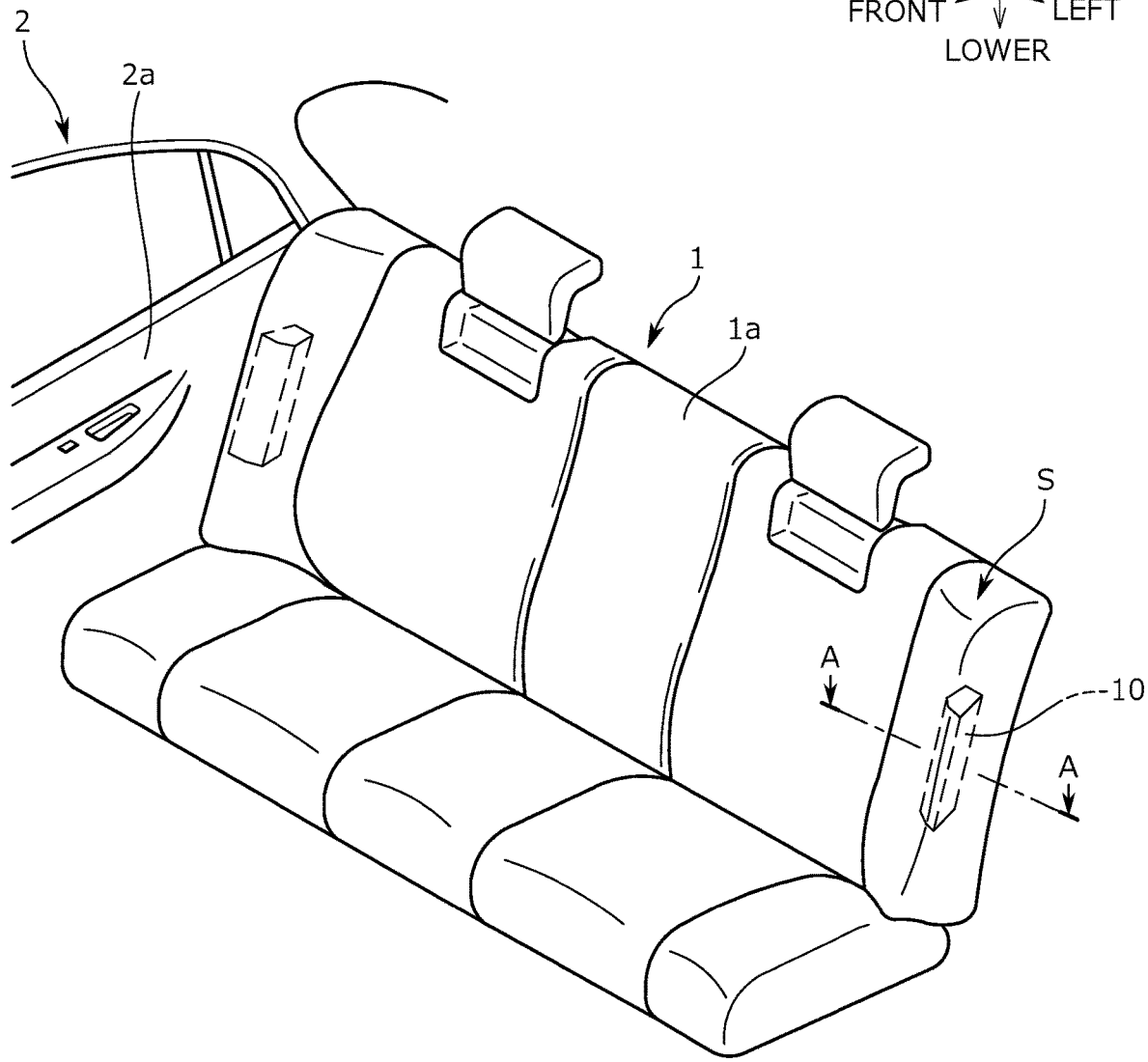
FIG. 1 is a perspective drawing illustrating an arrangement of a side air bag device, according to an embodiment.

A side air bag device S of the present embodiment is a device configured to absorb impact applied from a vehicle lateral side to a seated passenger. As illustrated in FIG. 1, the side air bag device S is, in a vehicle width direction, disposed between a seat back 1a as a backrest of a back seat 1 and a vehicle body door 2a of a vehicle body 2. Note that the side air bag device S of FIG. 1 is disposed on each of outer right and left sides of the back seat 1 in the vehicle width direction.

Figure 2:
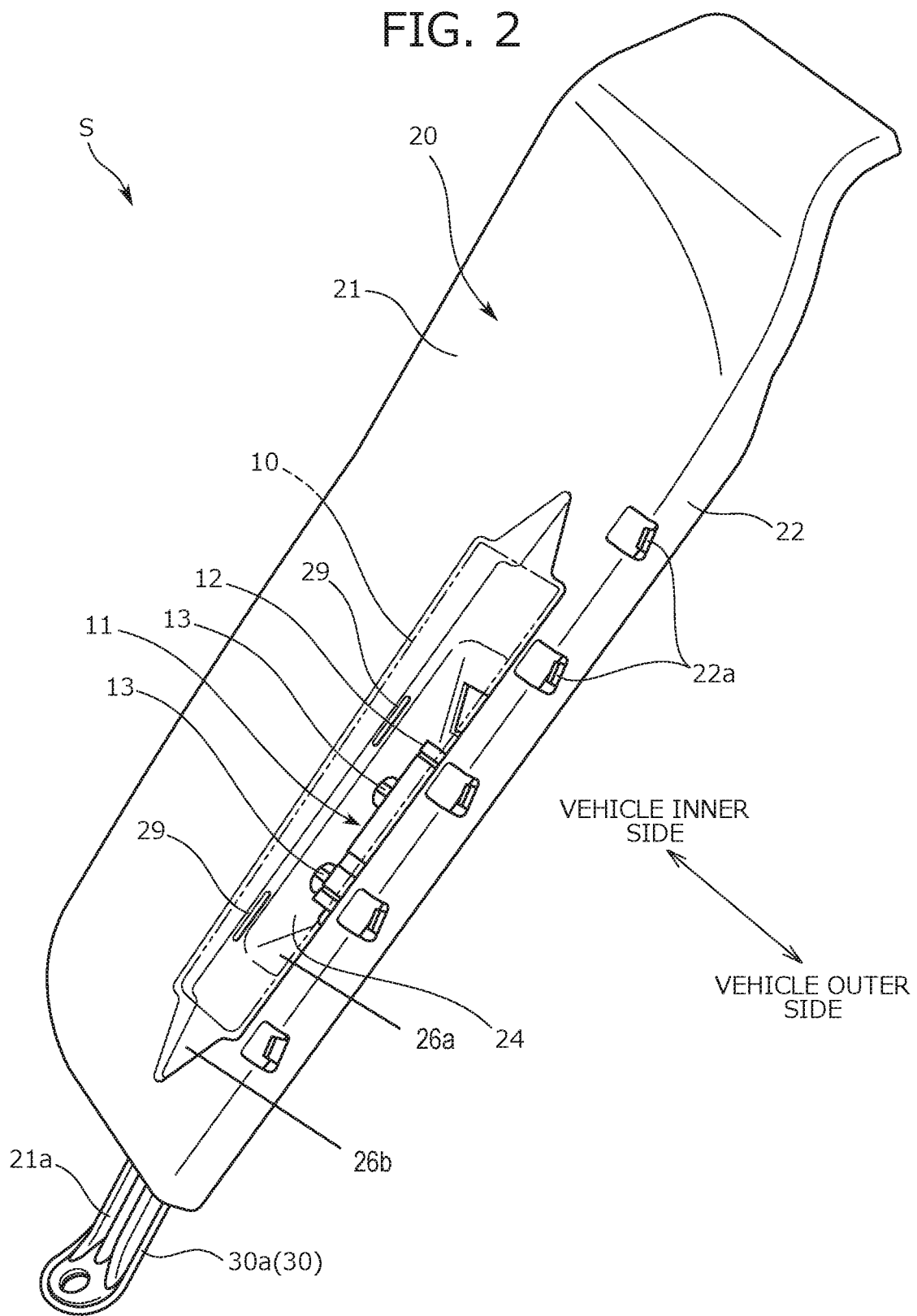
FIG. 2 is a perspective view of a base member of the side air bag device of FIG. 1 as viewed from a front side, according to an embodiment.
Figure 3:
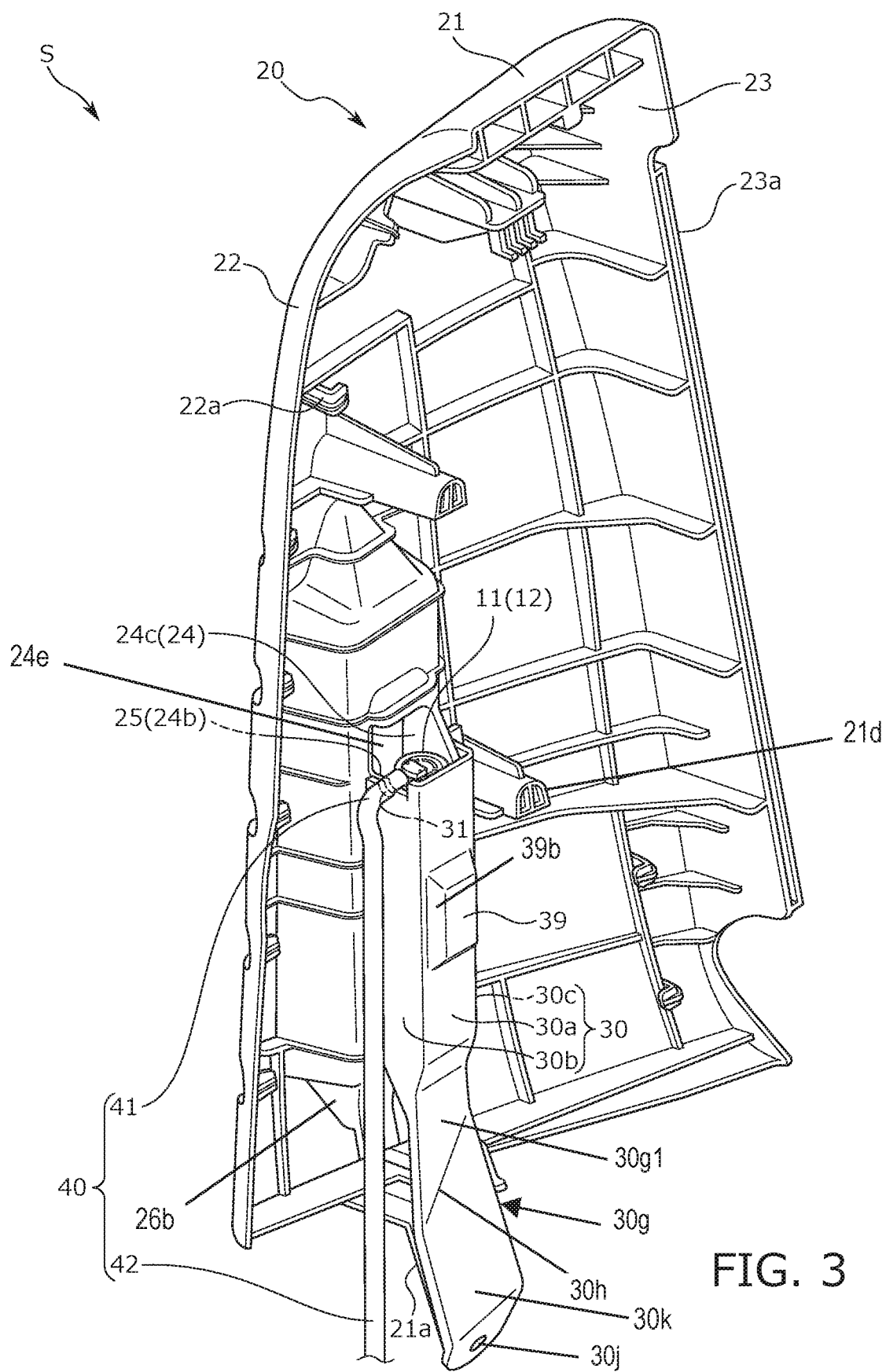
FIG. 3 is a perspective view of the base member as viewed from a back side, according to an embodiment.

As illustrated in FIG. 2, the side air bag device S includes an expandable air bag 10, an inflator 11 configured to supply gas into the air bag 10, and a base member 20 configured to store the air bag 10 and the inflator 11 in a folded state. Moreover, as illustrated in FIG. 3, the side air bag device S further includes a retainer member 30 configured to hold, from a vehicle back side, the air bag 10 and the inflator 11 stored in the base member 20, and a harness 40 connected to the inflator 11 and configured to supply ignition electric power to the inflator 11. Further, the side air bag device S includes, as illustrated in FIG. 7, a pad member 50 placed at a vehicle-front-side position of the base member 20, a skin material 60 configured to cover, from a vehicle front side, the base member 20 and the pad member 50, and a webbing 70 having one end portion sewn to the skin material 60 and the other end portion locked to webbing lock portions 27 of the base member 20 and configured to guide the air bag 10 in an expansion direction.

Figure 4:
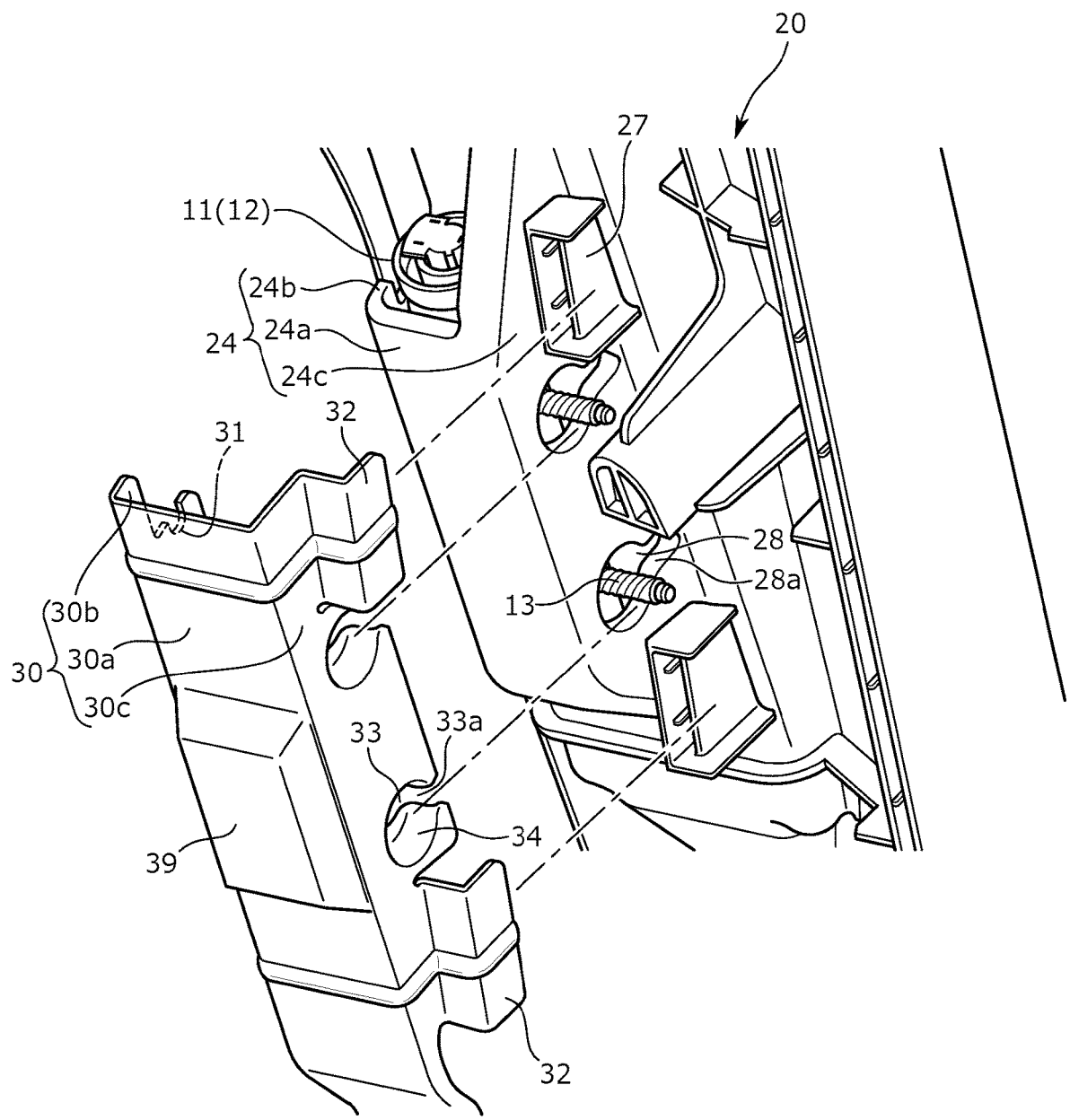
FIG. 4 is an exploded perspective view illustrating an assembly structure for the base member and a retainer member, according to an embodiment.
Figure 7:
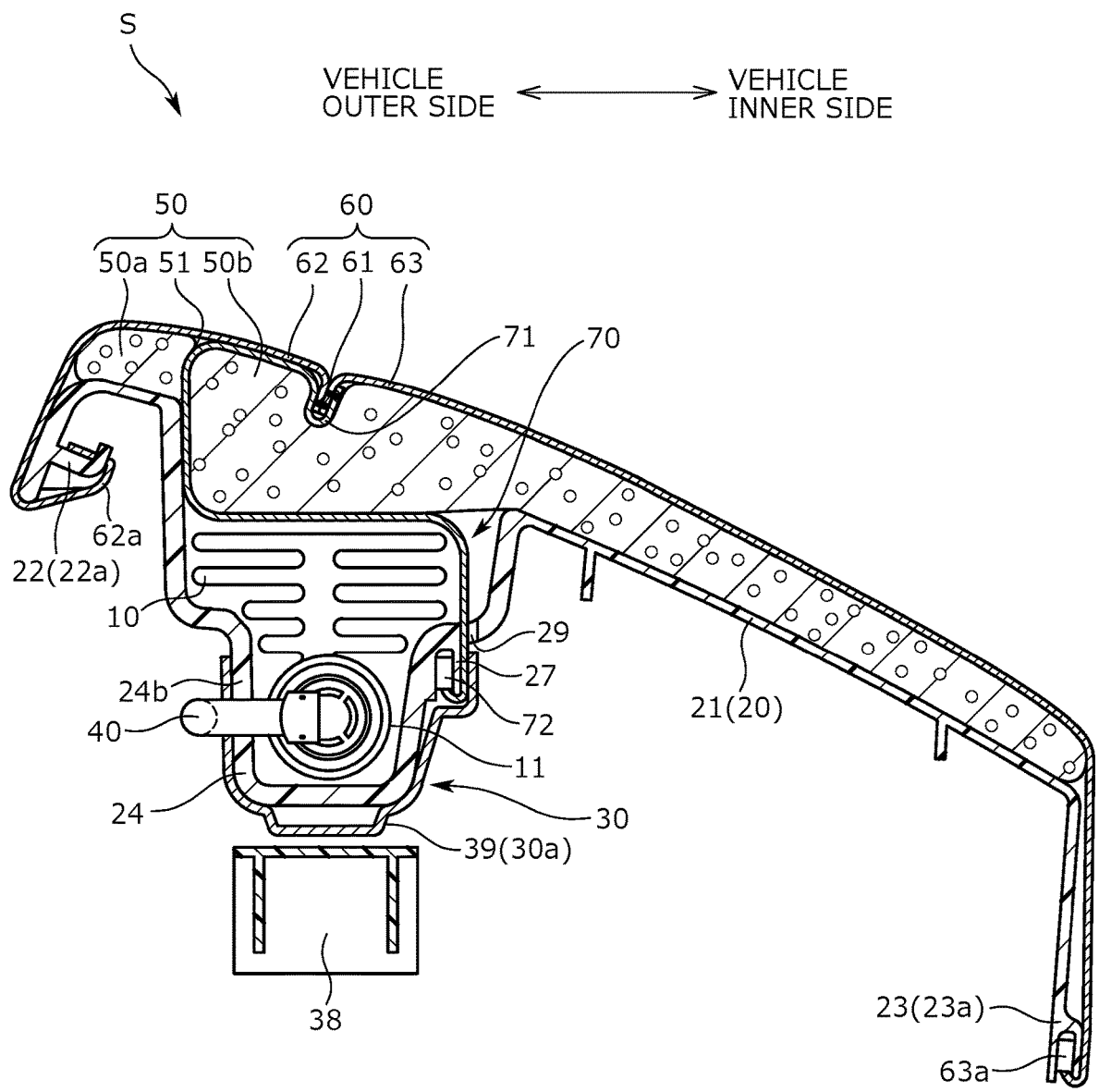
FIG. 7 is a cross-sectional view of the side air bag device along the line A-A of FIG. 1 in the state in which an air bag is stored, according to an embodiment.
Figure 8:
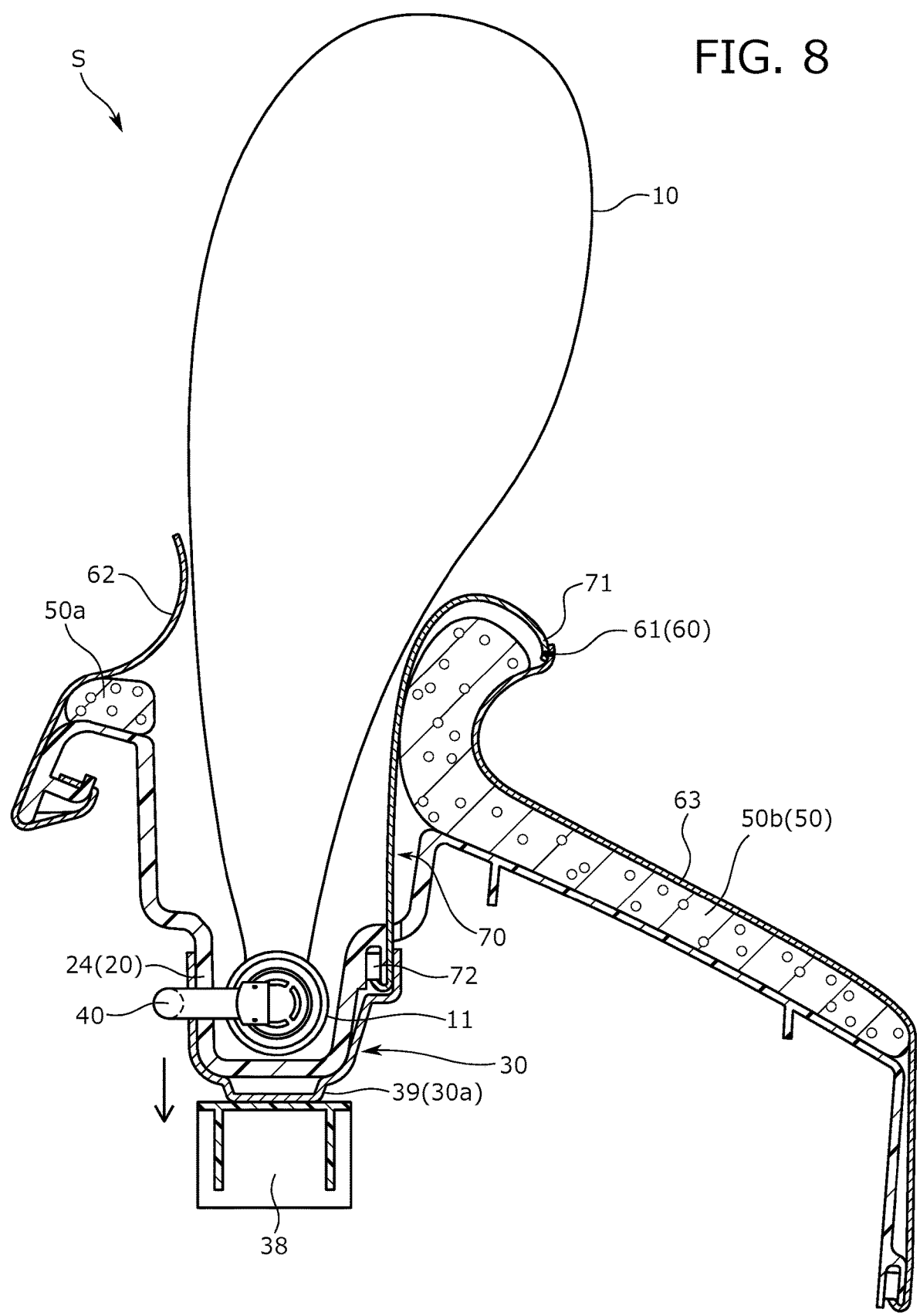
FIG. 8 is a cross-sectional view of the side air bag device along the line A-A of FIG. 1 in the state in which the air bag is expanded, according to an embodiment.

The air bag 10 includes a bag-shaped member configured to, when impact is applied from the vehicle lateral side, expand and deploy into a balloon shape, from the folded state of FIG. 7 toward the vehicle front side as illustrated in FIG. 8. Specifically, gas is supplied into the air bag 10 from the inflator 11 as a gas generation source coupled to the air bag 10; thereby, the air bag 10 expands. As illustrated in FIG. 2, the inflator 11 formed by an elongated substantially-columnar gas generation device is disposed elongated in an up-to-down direction. The inflator 11 includes an air bag coupling portion (not-shown) protruding toward the vehicle front side beyond an outer surface of the inflator 11 and coupled to the inside of the air bag 10, a harness connection portion 12 formed at an upper end portion of the inflator 11 and connected to the harness 40 illustrated in FIG. 3, and assembly shafts 13 protruding toward the vehicle lateral side beyond the outer surface of the inflator 11 and assembled to the base member 20 and the retainer member 30 as illustrated in FIG. 4.

When impact is applied from the vehicle lateral side in the above-described configuration, ignition electric power is supplied from a vehicle battery (not-shown) to the inflator 11 via the harness 40, the vehicle battery being disposed below the feet of the seated passenger on the vehicle body. Then, the air bag 10 expands and deploys at the side of the seated passenger. The air bag 10 and the inflator 11 are stored in a base storage 24 provided at the base member 20, described below.

The base member 20 includes a resin frame member as a base plate of the side air bag device S. As illustrated in FIG. 2, the base member 20 is configured to store the air bag 10 and the inflator 11. The base member 20 has a substantially inverted L-shape as viewed from the vehicle lateral side. The base member 20 is, in the vehicle width direction, disposed between the seat back 1a and the vehicle body door 2a. Upper and lower end portions of the base member 20 are detachably attached to vehicle members (not-shown), respectively. As illustrated in FIG. 2 or 3, the base member 20 generally includes a base body 21 disposed between the back seat 1 and the vehicle body 2, and base outer and inner wall portions 22, 23 that extend from both end portions of the base body 21 in the vehicle width direction toward the vehicle back side.

The base body 21 includes a plate-shaped member in a substantially inverted L-shape. The base body 21 includes, as components thereof, the base storage 24 integrally formed slightly closer to a vehicle outer side with respect to a center portion of the base body 21 in the vehicle width direction and recessed toward the vehicle back side, and a base attachment portion 21a integrally formed lower than the base storage 24, extending downward from the base body 21, and attached to a vehicle body member (not-shown). Note that another base attachment portion attachable to a vehicle body member is integrally formed at an upper end portion of the base body 21.

The base outer wall portion 22 formed by a substantially rectangular plate-shaped member is disposed facing the vehicle body door 2a. At an extending end portion of the base outer wall portion 22, a plurality of lock claws 22a configured to lock one end portion of the skin material 60 are integrally formed with a predetermined spacing in the up-to-down direction. Similarly, the base inner wall portion 23 formed by a substantially rectangular plate-shaped member is disposed facing the seat back 1a of the back seat 1. At an extending end portion of the base inner wall portion 23, an insertion groove 23a into which the other end portion of the skin material 60 is to be inserted is integrally formed elongated in the up-to-down direction. The width of the base outer wall portion 22 in a vehicle front-to-back direction is formed to be smaller than that of the base inner wall portion 23.

As illustrated in FIG. 2 or 3, the base storage 24 is formed by a vertically-elongated box provided with an opening on the vehicle front side and has a substantially convex internal space. The air bag 10 and the inflator 11 are detachably stored in a bottom portion of the internal space of the base storage 24. The base storage 24 includes a back wall portion 24a disposed on the vehicle back side of the air bag 10 and the inflator 11, outer and inner wall portions 24b, 24c that extend toward the vehicle front side from both end portions of the back wall portion 24a in the vehicle width direction and disposed respectively on the vehicle outer side in the vehicle width direction and on a vehicle inner side. An upper wall portion of the base storage 24 at an upper end thereof is provided with an opening such that the upper end portion of the inflator 11 is exposed through the opening.

As illustrated in FIG. 3, a cut portion 25 which can support a portion of the harness 40 is provided at a portion of the outer wall portion 24b so as to face the harness connection portion 12 of the inflator 11. As illustrated in FIG. 4, the inner wall portion 24c includes two webbing lock portions 27 which protrude with a predetermined spacing in the up-to-down direction and which can lock the other end portion of the webbing 70, base holes 28 which are arranged between the two webbing lock portions 27 and into which the assembly shafts 13 of the inflator 11 can be respectively inserted, and slits 28a which are continuous cuts from the base holes 28 toward the vehicle front side and into which the assembly shafts 13 can be respectively inserted. Note that the assembly shaft 13 is equivalent to an assembled portion of an inflator, which is for assembling the inflator to the base storage 24 and the retainer member 30.

As illustrated in FIG. 2 or 3, the base attachment portion 21a extends downward from the base body 21, and such an extending end portion of the base attachment portion 21a is attached to the vehicle body member. Specifically, the base attachment portion 21a has a deflecting shape obtained by bending the base attachment portion 21a along a vehicle body shape on the vehicle back side, and the extending end portion of the base attachment portion 21a is provided with a bolt fastening hole for the vehicle body member. The base member 20 and the vehicle body member are attached to each other by bolt fastening.

The retainer member 30 includes a metal holding member configured to hold the air bag 10 and the inflator 11 from the vehicle back side, and as illustrated in FIG. 3, the retainer member 30 is attached to the base storage 24 from the vehicle back side. The retainer member 30 has a substantially U-shape in cross section. The retainer member 30 includes a back wall portion 30a disposed on the vehicle back side of the base storage 24, and outer and inner wall portions 30b, 30c that extend toward the vehicle front side from both end portions of the back wall portion 30a in the vehicle width direction and disposed respectively on the vehicle outer and inner sides. The outer wall portion 30b and the inner wall portion 30c are disposed along the outer wall portion 24b and the inner wall portion 24c, respectively, of the base storage 24.

As illustrated in FIG. 3, the back wall portion 30a of the retainer member 30 extends downward from a portion holding the base storage 24 toward the base attachment portion 21a. The back wall portion 30a is attached to the vehicle body member (not-shown) together with the base attachment portion 21a in a state where a portion of the back wall portion 30a is overlapped with a back surface of the base attachment portion 21a. The downwardly-extending portion of the back wall portion 30a has a deflecting shape (a deflecting portion) obtained by bending the back wall portion 30a along the base attachment portion 21a on the vehicle front side and along the vehicle body shape on the vehicle back side. Specifically, the downwardly-extending portion of the back wall portion 30a has the deflecting shape including: a portion extending from the portion holding the base storage 24 to face the vehicle front side; a portion further extending from such a portion to bend toward the vehicle inner side; and an extending end portion still further extending from such a portion to bend toward the vehicle outer side. The extending end portion is provided with a bolt fastening hole for the vehicle body member and is bolt-fastened together with the base attachment portion 21a.

A portion of the back wall portion 30a overlapped with the base attachment portion 21a extends from the base attachment portion 21a toward the base storage 24, substantially to the center position between the base attachment portion 21a and the base storage 24. Note that flange portions protruding toward the vehicle front side are formed at both end portions in the vehicle width direction of the extending portion of the back wall portion 30a. Thus, rigidity of the retainer member can be ensured, and rigidity of attachment to the base attachment portion 21a can be improved. As illustrated in FIG. 4, the back wall portion 30a further includes a protrusion 39 provided at an upper portion of the back wall portion 30a so as to face the inflator 11 and protrude toward the vehicle back side.

As illustrated in FIG. 3, the outer wall portion 30b is provided with a cut portion 31 which is formed at a portion facing the cut portion 25 of the base member 20 and which can support a portion of the harness 40. As illustrated in FIG. 4, the inner wall portion 30c includes: two webbing holding portions 32 which protrude with a predetermined spacing in the up-to-down direction and which are configured to hold the webbing lock portions 27 locking the webbing 70; two retainer holes 33 which are formed with a predetermined spacing in the up-to-down direction, which are arranged between the two webbing holding portions 32, and into which the assembly shafts 13 of the inflator 11 can be respectively inserted; slits 33a which are continuous cuts from the retainer holes 33 toward the vehicle front side and into which the assembly shafts 13 can be respectively inserted; and fitting recesses 34 which are formed to be recessed toward the inflator 11 respectively at peripheral edge portions of the retainer holes 33 and into which assembly members 35 can be respectively fitted.

As illustrated in FIG. 4, each webbing holding portion 32 having a substantially L-shape in cross section is formed such that a portion of the inner wall portion 30c bends toward the vehicle inner side. Each webbing holding portion 32 is provided with a bead, corresponding to a reinforcement portion, so as to be located on one surface opposite from the other surface to which the webbing 70 is to be attached. Thus, support rigidity of the webbing holding portion 32 is improved. Note that in addition to a bead shape, a stepped shape or the like may be applied as the reinforcement portion.

The retainer hole 33 and the base hole 28 are arranged to communicate with each other in a state where the retainer member 30 and the base storage 24 are attached to each other. Specifically, each fitting recess 34 of the retainer member 30 is fitted to a corresponding one of the base holes 28, and in this manner, the retainer member 30 and the base storage 24 are attached to each other. Each fitting recess 34 is narrowed in a tapered shape from an opening toward a bottom portion, therefore being easily fitted to a corresponding one of the base holes 28.

Figure 5:
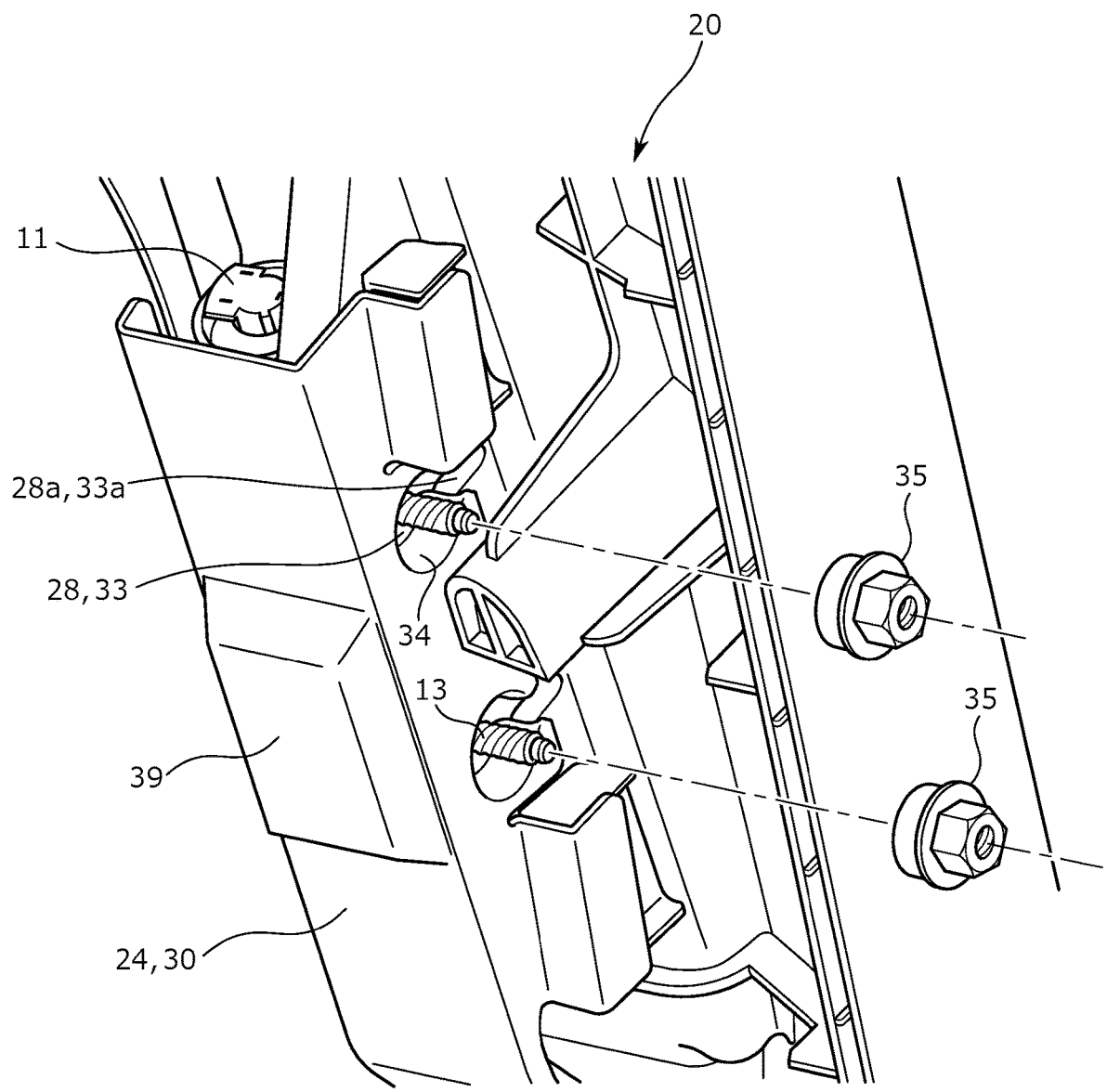
FIG. 5 is an exploded perspective view illustrating an assembly structure for assembly shafts of an inflator and an assembly member of a side air bag device, according to an embodiment.

In the above-described configuration, each assembly shaft 13 of the inflator 11 is, as illustrated in FIG. 5, inserted into a corresponding one of the base holes 28 and a corresponding one of the retainer holes 33, and the inserted end portion is attached to a corresponding one of the assembly members 35 corresponding to attachment nuts. Thus, the inflator 11, and the base member 20, and the retainer member 30 are fixed together. When each assembly member 35 is attached to a corresponding one of the assembly shafts 13, the assembly member 35 is fitted and housed in a corresponding one of the fitting recesses 34 of the retainer member 30, therefore being compactly arranged.

Moreover, in the above-described configuration, the slits 28a are formed at the base storage 24 as illustrated in FIG. 4. Thus, in storing the inflator 11 in the base storage 24, a portion of each assembly shaft 13 of the inflator 11 can be inserted into a corresponding one of the slits 28a with the assembly shaft 13 being inclined, and then, the assembly shaft 13 can be inserted while the inflator 11 is being further rotated. As a result, contact between each assembly shaft 13 and the base storage 24 can be inhibited, and therefore, the process of storing the inflator 11 is facilitated.

Further, in the above-described configuration, the slits 33a are formed at the retainer member 30 as illustrated in FIG. 5. Thus, when the retainer member 30 is attached to a back surface of the base storage 24, contact between the retainer member 30 and each assembly shaft 13 of the inflator 11 exposed through a corresponding one of the base holes 28 of the base storage 24 can be inhibited, and therefore, the process of attaching the retainer member 30 is facilitated.

Figure 6:
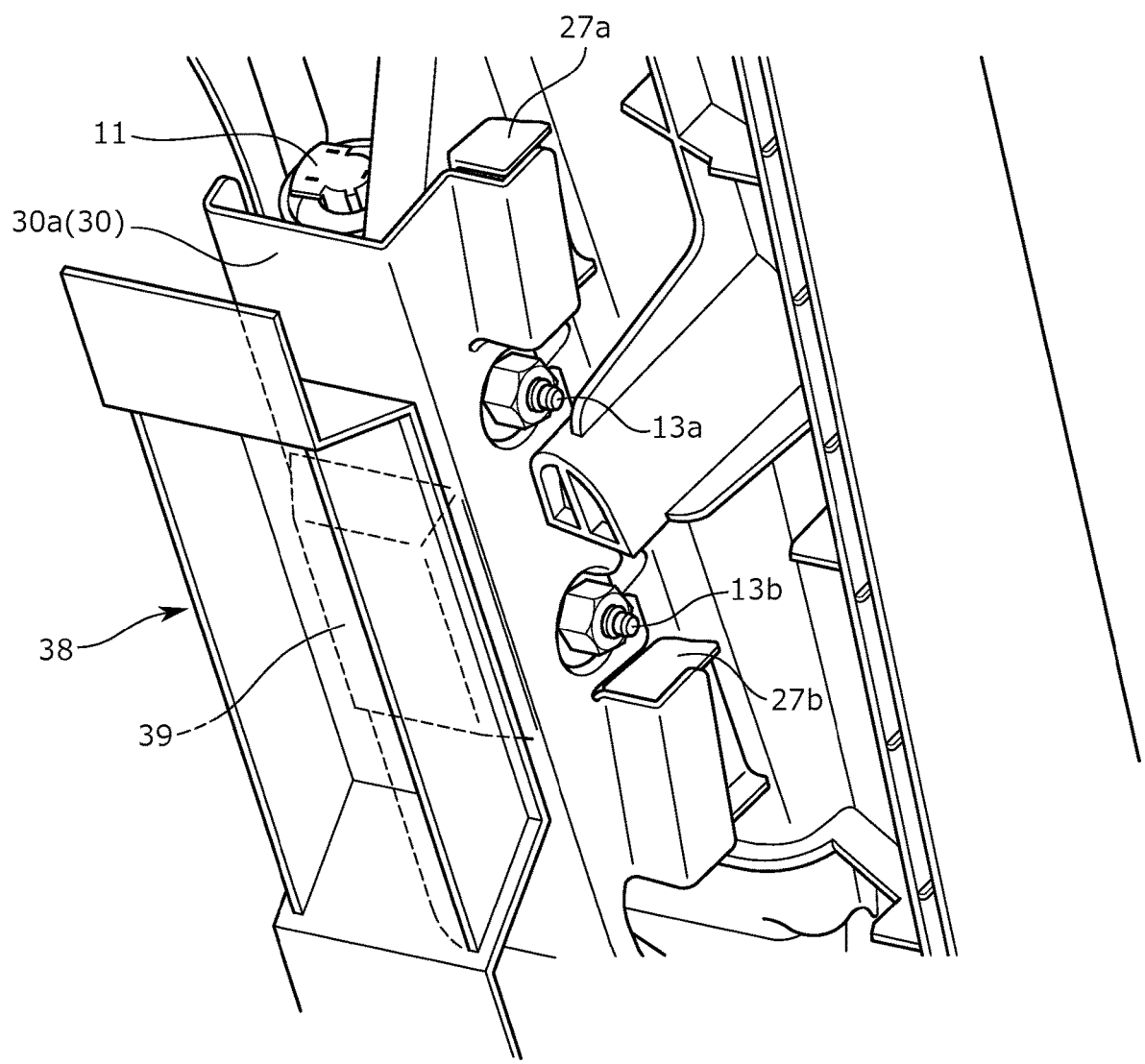
FIG. 6 is a perspective view illustrating an arrangement relationship between the retainer member and a vehicle body member, according to an embodiment.

As illustrated in FIGS. 6 and 7, the protrusion 39 having a substantially cuboid shape is formed such that a portion of the back wall portion 30a is recessed toward the vehicle back side. The protrusion 39 is disposed with a predetermined spacing from a vehicle body member 38 located on the vehicle back side. The protrusion 39 is, in the up-to-down direction, disposed between an upper end of an assembly shaft 13a of the inflator 11 and a lower end of an assembly shaft 13b of the inflator 11. Further, the protrusion 39 is, in the up-to-down direction, disposed between webbing lock portions 27a, 27b provided at the base storage 24.

As illustrated in FIG. 8, the protrusion 39 is disposed in contact with the vehicle body member 38 in the vehicle front-to-back direction when the air bag 10 expands and deploys, and the protrusion 39 serves as a member configured to restrict tilting of the retainer member 30 toward the vehicle back side. Specifically, when the air bag 10 expands and deploys, a planar portion of the protrusion 39 on the vehicle back side serves as a load receiving surface for the vehicle body member 38 as illustrated in FIG. 6, therefore making contact with a planar surface of the vehicle body member 38 on the vehicle front side.

In the above-described configuration, before the air bag 10 expands and deploys, as illustrated in FIG. 7, the protrusion 39 is provided with a spacing so as not to make contact with the protrusion 39. Thus, in driving of a vehicle, contact noises between the vehicle body and the side air bag device S can be reduced.

Moreover, in the above-described configuration, the protrusion 39 is, in the up-to-down direction, disposed between the assembly shaft 13a and the assembly shaft 13b of the inflator 11. Specifically, the protrusion 39 is arranged at a position corresponding substantially to the center portion of the inflator 11 in the up-to-down direction. Thus, the retainer member 30 can efficiently receive reactive force generated when the air bag 10 expands and deploys toward the vehicle front side. Note that the protrusion 39 improves rigidity of the periphery of the protrusion 39 of the retainer member 30, in some embodiments.

Further, in the above-described configuration, the load receiving surface of the protrusion 39 for the vehicle body member 38 is formed in a planar shape so as to conform to the shape of the contact surface of the vehicle body member 38. Thus, the load receiving surface optimal for the vehicle body member 38 at the time of expansion and deployment of the air bag can be provided at the retainer member 30.

In addition, in the above-described configuration, the retainer member 30 is, as illustrated in FIG. 2, provided so that an upper end of the protrusion 39 can contact the vehicle body member 38 and so that a lower end of the protrusion 39 is attached to the vehicle body member (not-shown). Thus, rigidity of attachment to the vehicle body is further improved.

The harness 40 is a wire harness configured to supply ignition electric power to the inflator 11. The harness 40 is formed such that a plurality of electrical wires is bundled by a corrugated tube and a coupler is attached to each end portion of the bundled wire. As illustrated in FIG. 3, an upper end portion 41 of the harness 40 is connected to the harness connection portion 12 located at the upper end portion of the inflator 11, and a lower end portion 42 of the harness 40 is connected to the vehicle battery disposed below the feet of the seated passenger on the vehicle body. The harness 40 extends to be elongated in the up-to-down direction.

The harness 40 extends across over along the up-to-down direction while being supported by the base member 20 and the retainer member 30. Specifically, as illustrated in FIG. 3, the harness 40 extends outward in the vehicle width direction from the upper end portion 41 connected to the harness connection portion 12 of the inflator 11, and the harness 40 is supported with the upper end portion thereof being attached to the cut portion 25 of the base storage 24 and to the cut portion 31 of the retainer member 30. In this state, the corrugated tube is wound around the harness 40 and thereby a raised-recessed shape is formed on an outer surface of the harness 40. The harness 40 is hooked on the cut portions 25, 31, therefore being positioned and supported thereat.

The harness 40 bends while extending downward from the hooked upper end portion thereof. Moreover, a center portion of the harness 40 in the up-to-down direction is supported along the outer wall portion 30b of the retainer member 30. Then, the harness 40 extends downward from the center portion thereof such that the lower end portion 42 is connected to the vehicle battery provided on the vehicle body.

As illustrated in FIG. 7, the pad member 50, formed by a cushion material placed between the base member 20 and the skin material 60, is disposed over the entire surface of the base member 20 on the vehicle front side. Note that the pad member 50 is fixed to a pad attachment portion (not-shown) provided at the base member 20, thereby being coupled to the base member 20. A portion of the pad member 50 facing the base storage 24, specifically, a portion of the base storage 24 facing the outer wall portion 24b, is provided with a pad opening 51 penetrating in the vehicle front-to-back direction.

The pad member 50 integrally includes: an outer pad member 50a disposed on the vehicle outer side with respect to the pad opening 51; and an inner pad member 50b disposed on the vehicle inner side with respect to the pad opening 51. The pad opening 51 is an opening elongated in the up-to-down direction, and the webbing 70 is inserted into the pad opening 51 from the skin material 60 toward the base member 20. The pad opening 51 is, in the vehicle width direction, positioned on the opposite side of the webbing lock portions 27 with respect to the air bag 10.

In the above-described configuration, when the air bag 10 expands and deploys as illustrated in FIG. 8, the pad member 50 unfolds to be separated from the pad opening 51 as a separation point into the outer pad member 50a and the inner pad member 50b in the vehicle width direction. In this state, the air bag 10 is guided by the webbing 70 in the expansion direction; therefore the air bag 10 can suitably deploy without scattering of a portion of the pad member 50 located on the vehicle front side of the base storage 24. Specifically, the outer pad member 50a is provided substantially so as not to move from a predetermined position after expansion and deployment of the air bag 10; meanwhile, a portion of the inner pad member 50b unfolds toward the vehicle front side together with the webbing 70.

As illustrated in FIG. 7, the skin material 60 includes a member configured to cover the base member 20 and the pad member 50 from the vehicle front side. At a position corresponding substantially to the center portion of the base storage 24, substantially at the center portion of the skin material 60 in the vehicle width direction, a skin breakable portion 61 as a portion to be broken at the time of expansion and deployment of the air bag 10 is formed. The skin material 60 includes: an outer skin material 62 having one end portion coupled to the position of the skin breakable portion 61 and disposed on the vehicle outer side with respect to the skin breakable portion 61; and an inner skin material 63 having one end portion coupled to the position of the skin breakable portion 61 and disposed on the vehicle inner side with respect to the skin breakable portion 61.

The other end portion 62a of the outer skin material 62 on the vehicle outer side is locked to the lock claws 22a of the base outer wall portion 22 so as to extend in the up-to-down direction, and the other end portion 63a of the inner skin material 63 is inserted into the insertion groove 23a of the base inner wall portion 23. Specifically, the other end portion 62a of the outer skin material 62 is provided with lock holes formed in the up-to-down direction for locking to the lock claws 22a, and a resin trim strip for insertion into the insertion groove 23a is sewn to the other end portion 63a of the inner skin material 63.

In the above-described configuration, when the air bag 10 expands and deploys as illustrated in FIG. 8, the skin material 60 unfolds so as to be separated from the skin breakable portion 61 as a separation point into the outer skin material 62 and the inner skin material 63. The skin breakable portion 61 is positioned so as to overlap the air bag 10 in the vehicle width direction.

The webbing 70 includes a fabric member configured to guide the air bag 10 in the expansion and deployment direction toward the vehicle front side. As illustrated in FIG. 7, one end portion 71 of the webbing 70 is attached to the skin breakable portion 61 of the skin material 60. The webbing 70 extends from the one end portion 71 to cover the pad member 50, and the other end portion 72 of the webbing 70 is locked at the webbing lock portions 27 of the base member 20.

Specifically, the webbing 70 extends from the one end portion 71 sewn to the skin breakable portion 61 of the inner skin material 63, along a front surface of the inner pad member 50b, toward the vehicle outer side, and subsequently reaches a portion facing the pad opening 51. Then, the webbing 70 extends through the pad opening 51 along a vehicle outer surface and a back surface of the inner pad member 50b, and subsequently reaches a webbing insertion hole 29 provided at the inner wall portion 24c of the base storage 24. In this state, the webbing 70 extends to pass between the pad member 50 and the air bag 10 in the vehicle front-to-back direction.

Then, the webbing 70 extends to the webbing lock portions 27 through the webbing insertion hole provided at the base storage 24, and the webbing 70 is subsequently locked to the webbing lock portions 27. In this state, a resin trim strip for locking to the webbing lock portions 27 is sewn to the other end portion 72 of the webbing 70.

In the above-described configuration, when the air bag 10 expands and deploys as illustrated in FIG. 8, the webbing 70 guides the air bag 10 in the expansion direction toward the skin breakable portion 61 of the skin material 60. Moreover, the one end portion 71 of the webbing 70 is deployed together with the inner pad member 50b and the inner skin material 63 toward the front side in the vehicle front-to-back direction, and also deployed toward the vehicle inner side in the vehicle width direction.

Moreover, in the above-described configuration, as illustrated in FIGS. 7 and 8, the retainer member 30 holding the air bag 10 and the inflator 11 from the vehicle back side is disposed such that the vehicle body member 38 on the vehicle back side of the retainer member 30 makes contacts with the retainer member 30 and supports the retainer member 30. Thus, support rigidity of the retainer member 30 for the base storage 24 is improved, and therefore, deformation of the periphery of the base storage 24 can be inhibited when the air bag 10 expands and deploys. Accordingly, the air bag 10 can stably deploy in the expansion and deployment direction.

Figure 9:
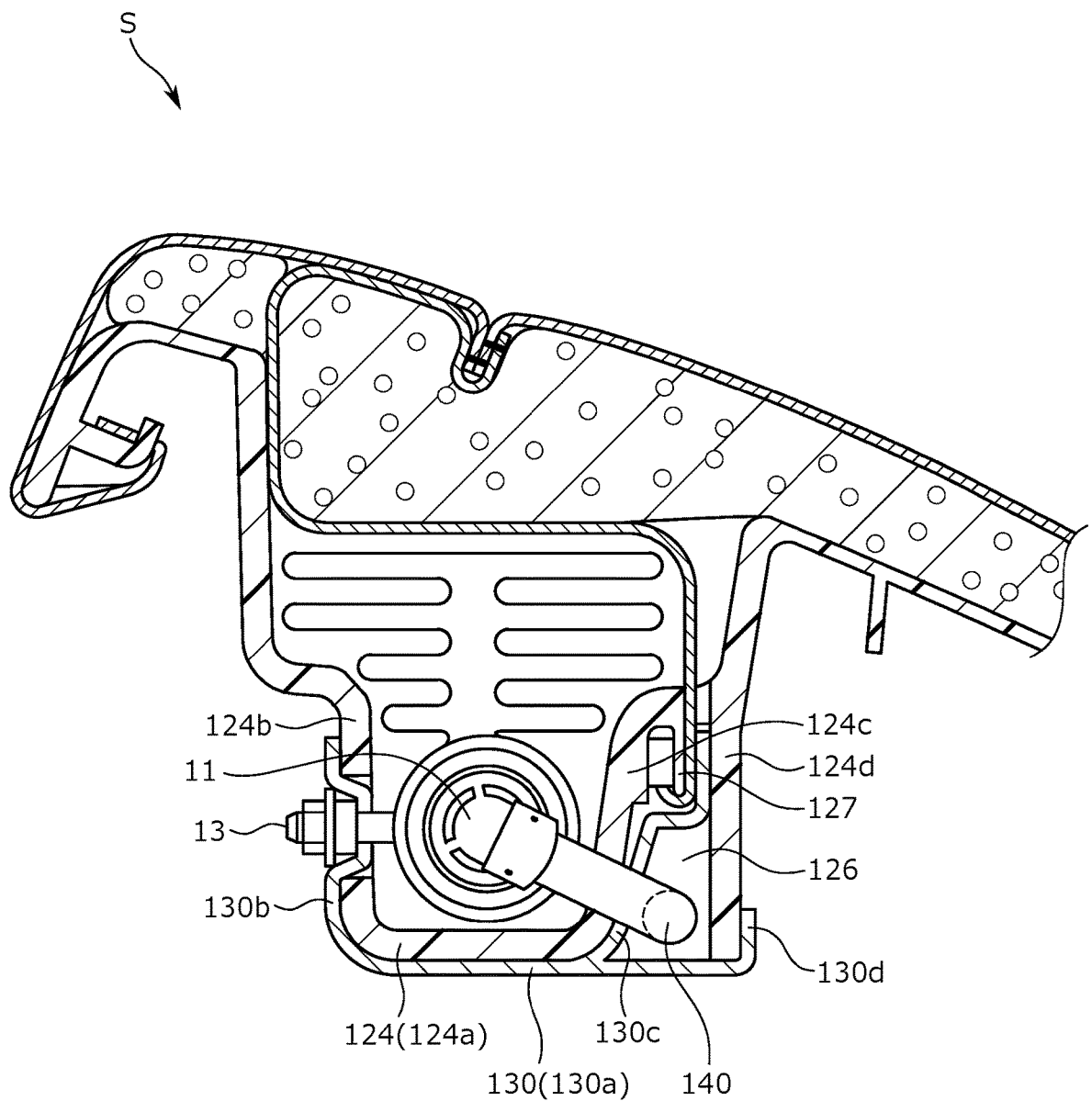
FIG. 9 is a cross-sectional view of a second embodiment of the side air bag device along the line A-A of FIG. 1, according to an embodiment.

Next, a second embodiment of the side air bag device S is described in accordance with FIG. 9. Note that the contents overlapping with those of the above-described side air bag device S will not be described. The configuration of the side air bag device S of the second embodiment is different from that of the first embodiment in that a harness 140 is supported in the up-to-down direction while being surrounded by a housing recess 126 formed at a base storage 124 and by a retainer member 130.

As illustrated in FIG. 9, the base storage 124 includes a back wall portion 124a, outer and inner wall portions 124b, 124c that extend from the back wall portion 124a toward the vehicle front side, and a second inner wall portion 124d provided at the inner wall portion 124c and disposed on the vehicle inner side from webbing lock portions 127 to extend toward the vehicle back side. The second inner wall portion 124d includes a reinforcement rib integrally provided at the base storage 124, and the second inner wall portion 124d and the inner wall portion 124c form the housing recess 126 having a substantially U-shape in cross section. The housing recess 126 is formed to be recessed toward the vehicle front side, toward the opposite side from the retainer member 130, and the housing recess 126 is formed to house the harness 140 in the up-to-down direction.

The retainer member 130 includes a back wall portion 130a, outer and inner wall portions 130b, 130c that extend from the back wall portion 130a toward the vehicle front side, and a second inner wall portion 130d provided at the back wall portion 130a and disposed on the vehicle inner side from the inner wall portion 130c to extend toward the vehicle front side. The second inner wall portion 130d is disposed on the vehicle inner side from the second inner wall portion 124d of a base member 120, and the back wall portion 130a and the inner wall portion 130c hold the second inner wall portion 124d so as to sandwich the second inner wall portion 124d therebetween.

The harness 140 is supported in a state where a center portion thereof in the up-to-down direction is surrounded by the housing recess 126 of the base storage 124 and the second inner wall portion 130d of the retainer member 130. In other words, the harness 140 is supported in a state where the center portion of the harness 140 in the up-to-down direction is surrounded by a housing portion formed by the back wall portion 130a, the inner wall portion 130c, and the second inner wall portion 130d of the retainer member 130 and by the second inner wall portion 124d of the base storage 124.

In the above-described configuration, the harness 140 and the webbing lock portions 127 are attached to the inner wall portion 124c of the base storage 124, whereas the assembly shafts 13 of the inflator 11 are assembled to the outer wall portion 124b. The harness 140 and the webbing lock portions 127 are arranged at different positions in the vehicle front-to-back direction. Thus, contact among these components can be inhibited, therefore increasing efficiency in the assembling process.

Moreover, in the above-described configuration, the webbing lock portions 127 are supported while being sandwiched between the inner wall portion 124c and the second inner wall portion 124d in the vehicle width direction, therefore improving support rigidity of the webbing lock portion 127.

Figure 10:
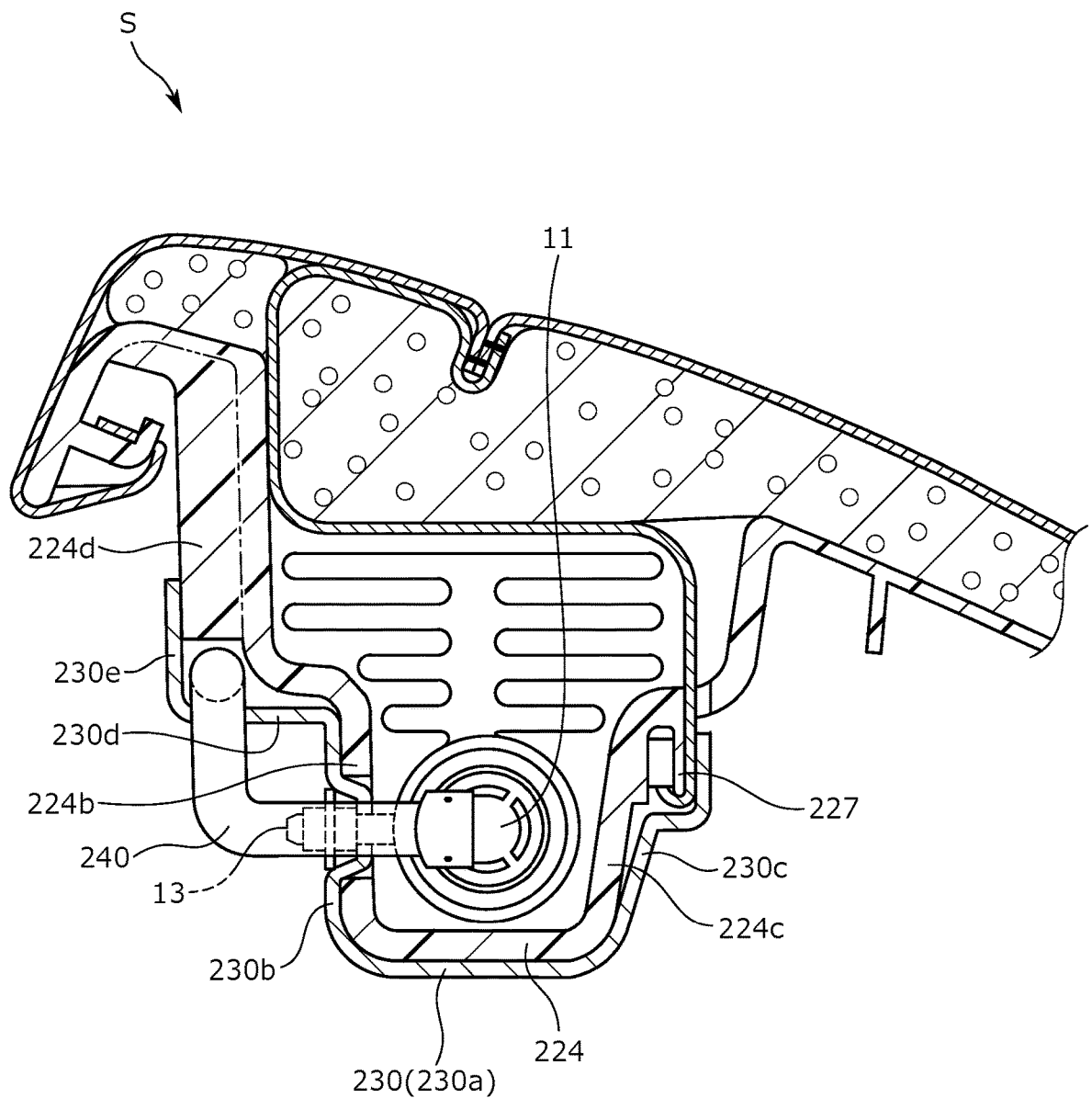
FIG. 10 is a cross-sectional view of a third embodiment of the side air bag device along the line A-A of FIG. 1, according to an embodiment.

Next, a third embodiment of the side air bag device S is described in accordance with FIG. 10. The configuration of the side air bag device S of the third embodiment is different from those of the foregoing embodiments in that a harness 240 is supported in the up-to-down direction while being sandwiched between an outer wall portion 224b of a base storage 224 and a retainer member 230.

As illustrated in FIG. 10, the base storage 224 includes the outer wall portion 224b, an inner wall portion 224c, and a second outer wall portion 224d provided on the vehicle outer side from the outer wall portion 224b and extending toward the vehicle back side. The second outer wall portion 224d includes a reinforcement rib integrally provided at the base storage 224 and ensures the thickness of the outer wall portion 224b.

The retainer member 230 includes a back wall portion 230a, outer and inner wall portions 230b, 230c that extend from the back wall portion 230a toward the vehicle front side, a second back wall portion 230d that extends from the outer wall portion 230b toward the vehicle outer side, and a second outer wall portion 230e that extends from the second back wall portion 230d toward the vehicle front side. The second back wall portion 230d and the second outer wall portion 230e extend along a back surface of the base storage 224.

The harness 240 is supported in a state where a center portion thereof in the up-to-down direction is surrounded by the outer wall portion 224b and the second outer wall portion 224d of the base storage 224 and by the second back wall portion 230d and the second outer wall portion 230e of the retainer member 230.

In the above-described configuration, the harness 240 and the assembly shafts 13 of the inflator 11 are attached to the outer wall portion 224b of the base storage 224, whereas webbing lock portions 227 are assembled to the inner wall portion 224c. The harness 240 and the assembly shafts 13 are arranged at different positions in the vehicle front-to-back direction. Thus, contact among these components can be reduced, leading to an efficient assembly process.

Figure 11:
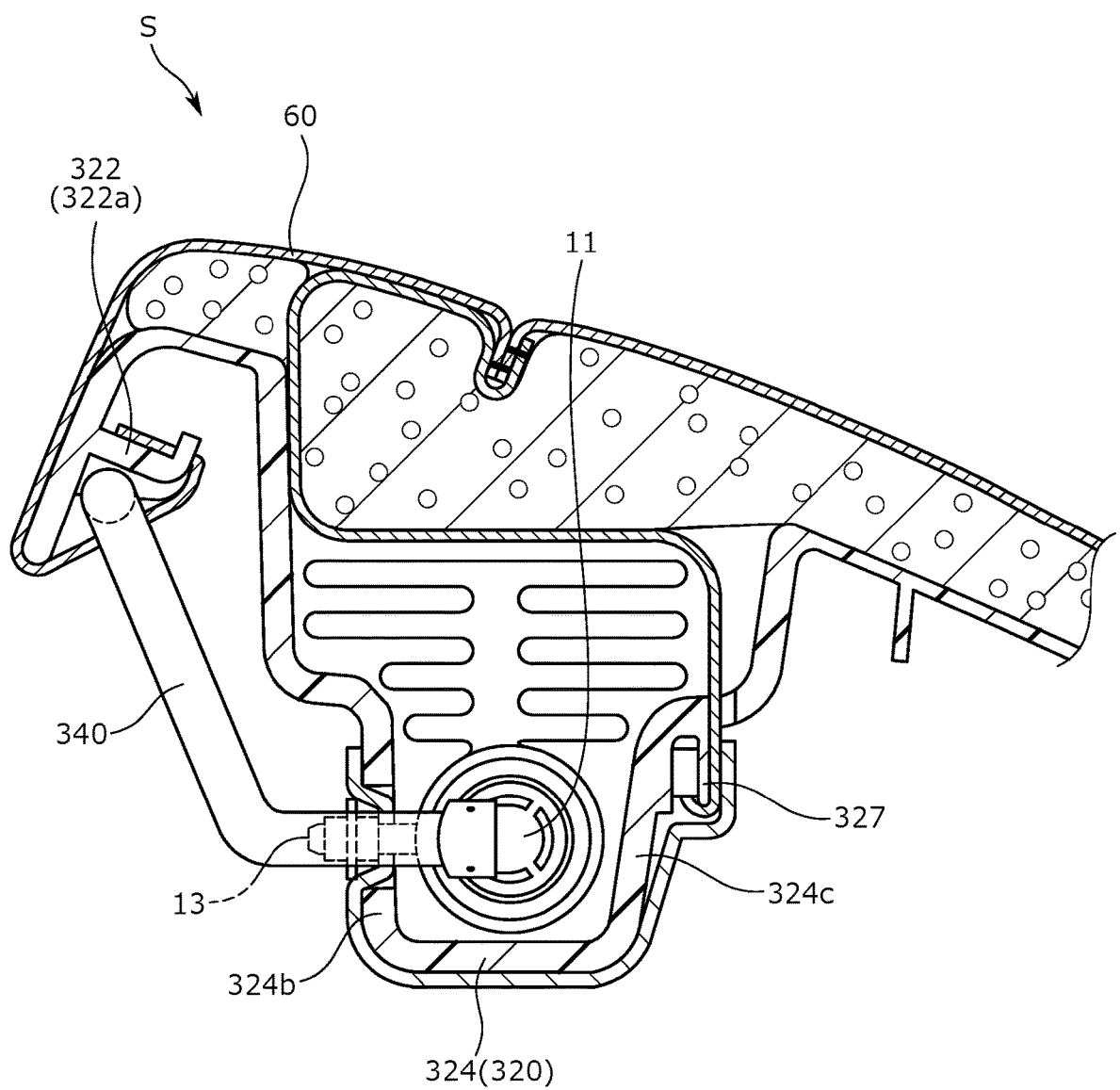
FIG. 11 is a cross-sectional view of a fourth embodiment of the side air bag device along the line A-A of FIG. 1, according to an embodiment.

Next, a fourth embodiment of the side air bag device S is described in accordance with FIG. 11. The configuration of the side air bag device S of the fourth embodiment is different from those of the foregoing embodiments in that a harness 340 is supported in the up-to-down direction while being sandwiched between the skin material 60 and each lock claw 322a provided at a base outer wall portion 322 of a base member 320.

The harness 340 is supported in the up-to-down direction in a state where a center portion thereof in the up-to-down direction is housed in an internal space formed by the skin material 60 and a lock recess provided behind the lock claw 322a. Specifically, the lock recess provided at the lock claw 322a is formed by cutting the lock claw from the vehicle back side toward the vehicle front side, and a vehicle-outer-side end portion of the skin material 60 is provided with a through-hole (not-shown) into which the harness 340 can be inserted.

In the above-described configuration, the harness 340 is attached to a vehicle-outer-side end portion of the base member 320, and the assembly shafts 13 of the inflator 11 are attached to an outer wall portion 324b of a base storage 324. Moreover, webbing lock portions 327 are assembled to an inner wall portion 324c. Thus, contact among these components can be inhibited, therefore increasing efficiency in the assembling process.

Figure 12:
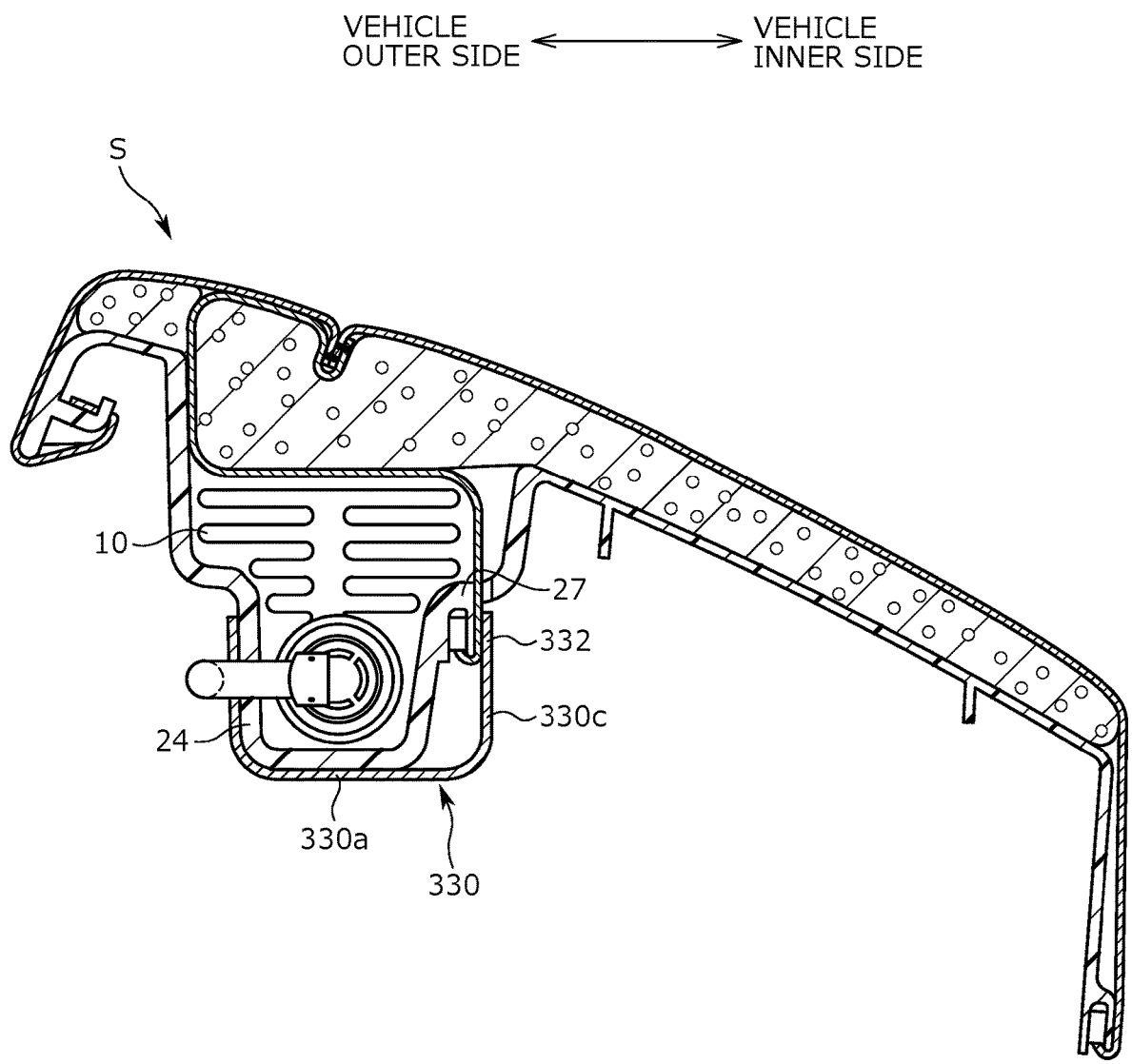
FIG. 12 is a cross-sectional view of a fifth embodiment of the side air bag device along the line A-A of FIG. 1, according to an embodiment.

Next, a fifth embodiment of the side air bag device S is described in accordance with FIG. 12. The configuration of the side air bag device S of the fifth embodiment is different compared with the first embodiment of FIG. 7, in that a retainer member 330 has a U-shape in cross section and in that a webbing holding portion 332 is formed without bending a portion of an inner wall portion 330c.

Specifically, the inner wall portion 330c extends in a substantially linear shape from a vehicle-inner-side end portion of a back wall portion 330a toward the vehicle front side, and the extending end portion of the inner wall portion 330c serves as the webbing holding portion 332 to cover and hold the webbing lock portions 27. Thus, as compared to the first embodiment of FIG. 7, the area where the retainer member 330 protects the base storage 24 is large, and impact applied at the time of expansion and deployment of the air bag 10 can be more efficiently received.

In the above-described embodiments, in the side air bag device S, as illustrated in FIG. 2 or FIG. 3, the base attachment portion 21a of the base member 20 and the extending end portion of the back wall portion 30a of the retainer member 30 are attached to the vehicle body member (not-shown) while being overlapped with each other. In this state, the base attachment portion 21a and the extending end portion of the back wall portion 30a are attached to each other by one bolt to the vehicle body member in a state where the bolt fastening hole provided at the base attachment portion 21a and the bolt fastening hole provided at the extending end portion of the back wall portion 30a are overlapped with each other so as to be coincident with each other. However, the embodiments of the present disclosure are not limited to this configuration. Alternatively, the bolt fastening holes may be provided at positions separated from each other, and the base attachment portion 21a and the extending end portion of the back wall portion 30a may be fastened to the vehicle body member by separate bolts. Moreover, the embodiments of the present disclosure are not limited to bolt fastening, and any fastening method may be applied as long as the base attachment portion 21a and the extending end portion of the back wall portion 30a are attached to the vehicle body member while being overlapped with each other.

In the above-described embodiment, as illustrated in FIG. 5, the assembled portion of the inflator 11 is the assembly shaft 13, and the assembly member 35 is configured as an assembly nut. The embodiments of the present disclosure are not limited to such configuration. Alternatively, the assembly nut may be provided at the inflator 11, and the assembly member 35 may be configured as the assembly shaft, and other known assembly methods may be employed.

In the above-described embodiment, in the base storage 24 of the base member 20, as illustrated in FIG. 3 or 4, the harness 40 is disposed at the outer wall portion 24b, and the webbing 70 and the assembly shafts 13 of the inflator 11 are arranged at the inner wall portion 24c, but not limited thereto. Alternatively, as illustrated in FIGS. 9 to 11, the arrangement positions may be changed as desired. In addition to the above, in the base storage 24, the harness 40 may be disposed at the back wall portion 24a, the assembly shafts 13 of the inflator 11 may be arranged at the outer wall portion 24b, and the other end portion 72 of the webbing 70 may be disposed at the inner wall portion 24c. With this configuration, contact among these components is inhibited and thus the components can be compactly arranged.

Figure 13:
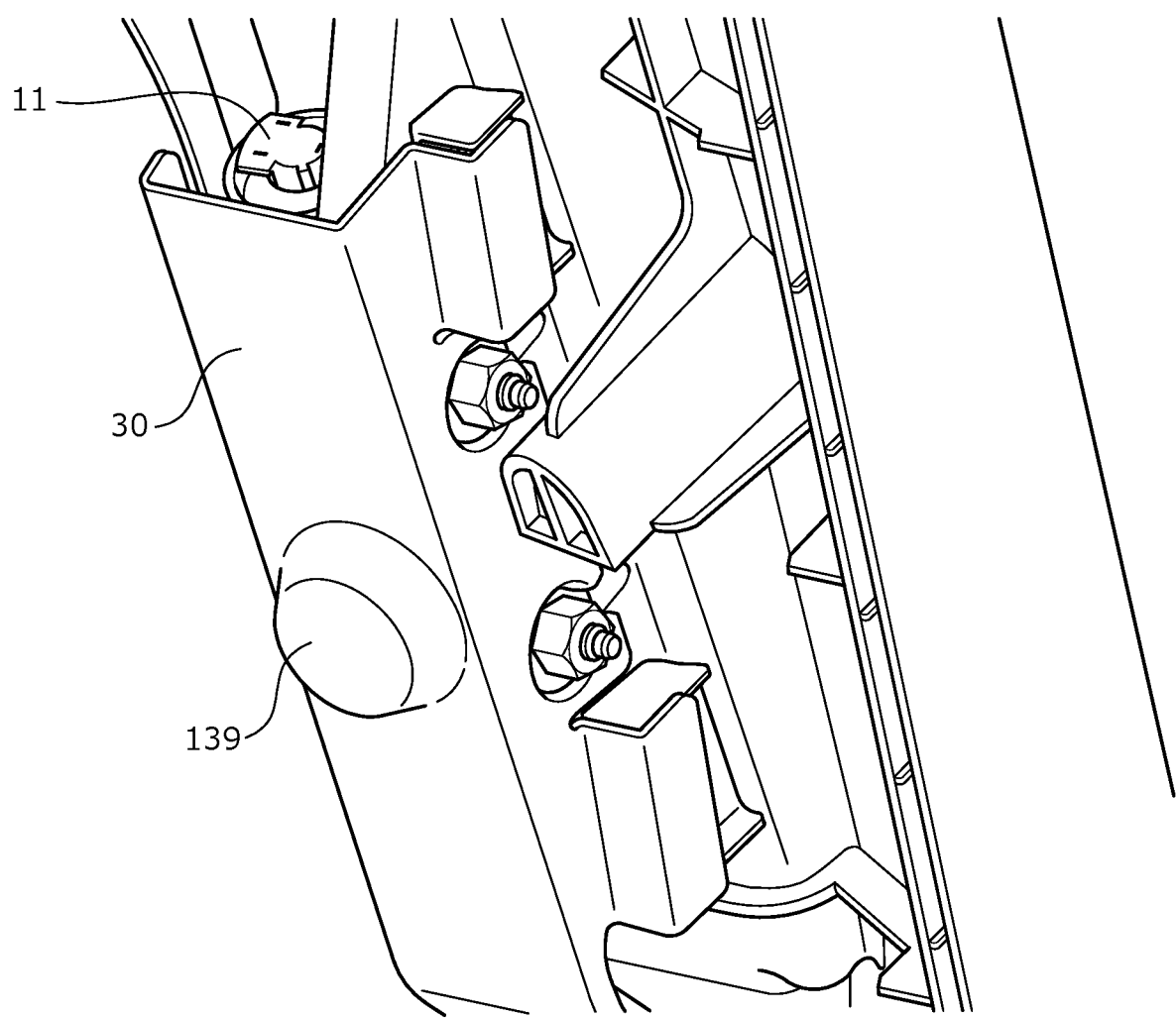
FIG. 13 is a perspective drawing illustrating a modified example of the retainer member of FIG. 5, according to an embodiment.

In the above-described embodiment, as illustrated in FIG. 6, the protrusion 39 having the substantially cuboid shape is formed integrally with the retainer member 30, but not limited thereto. Alternatively, the shape of the protrusion 39 may be changed as desired, so as to conform to the shape of the vehicle body member 38. For example, as illustrated in FIG. 13, a protrusion 139 having a substantially columnar shape may be provided integrally with the retainer member 30. The protrusion 139 is formed to have the substantially conical shape, an upper end of which is cut off along the horizontal plane. With this configuration, a load receiving surface of the protrusion 139 for the vehicle body member is mainly arranged at a position corresponding to the center portion of the inflator 11. Thus, the retainer member 30 can efficiently receive reactive force generated at the time of expansion and deployment of the air bag 10.

Figure 14:
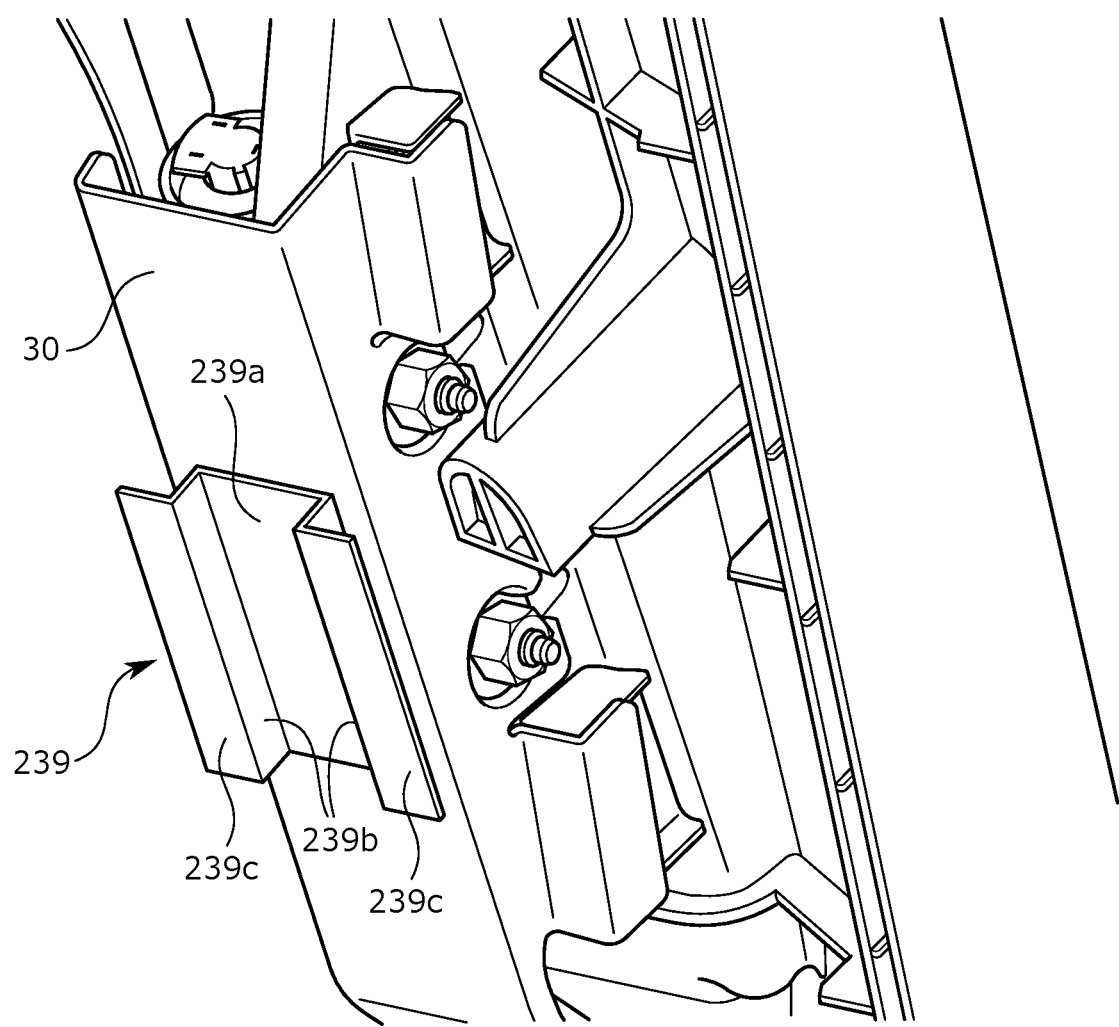
FIG. 14 is a perspective drawing illustrating another modified example of the retainer member of FIG. 5, according to an embodiment.

As another example, illustrated in FIG. 14, a protrusion 239 having a hat-like shape may be provided as a separate member from the retainer member 30. The protrusion 239 includes a front wall portion 239a coupled to the retainer member 30, right and left side wall portions 239b that extend respectively from both right and left ends of the front wall portion 239a toward the vehicle back side, and right and left back wall portions 239c outwardly extending respectively from the right and left side wall portions 239b toward the right and left sides. The protrusion 239 may be made of metal in the same way as the retainer member 30 or may be made of elastically deformable resin or rubber. With this configuration, the load receiving surface optimal for the shape of the vehicle body member can be freely formed regardless of molding conditions of the retainer member.

Figure 15:
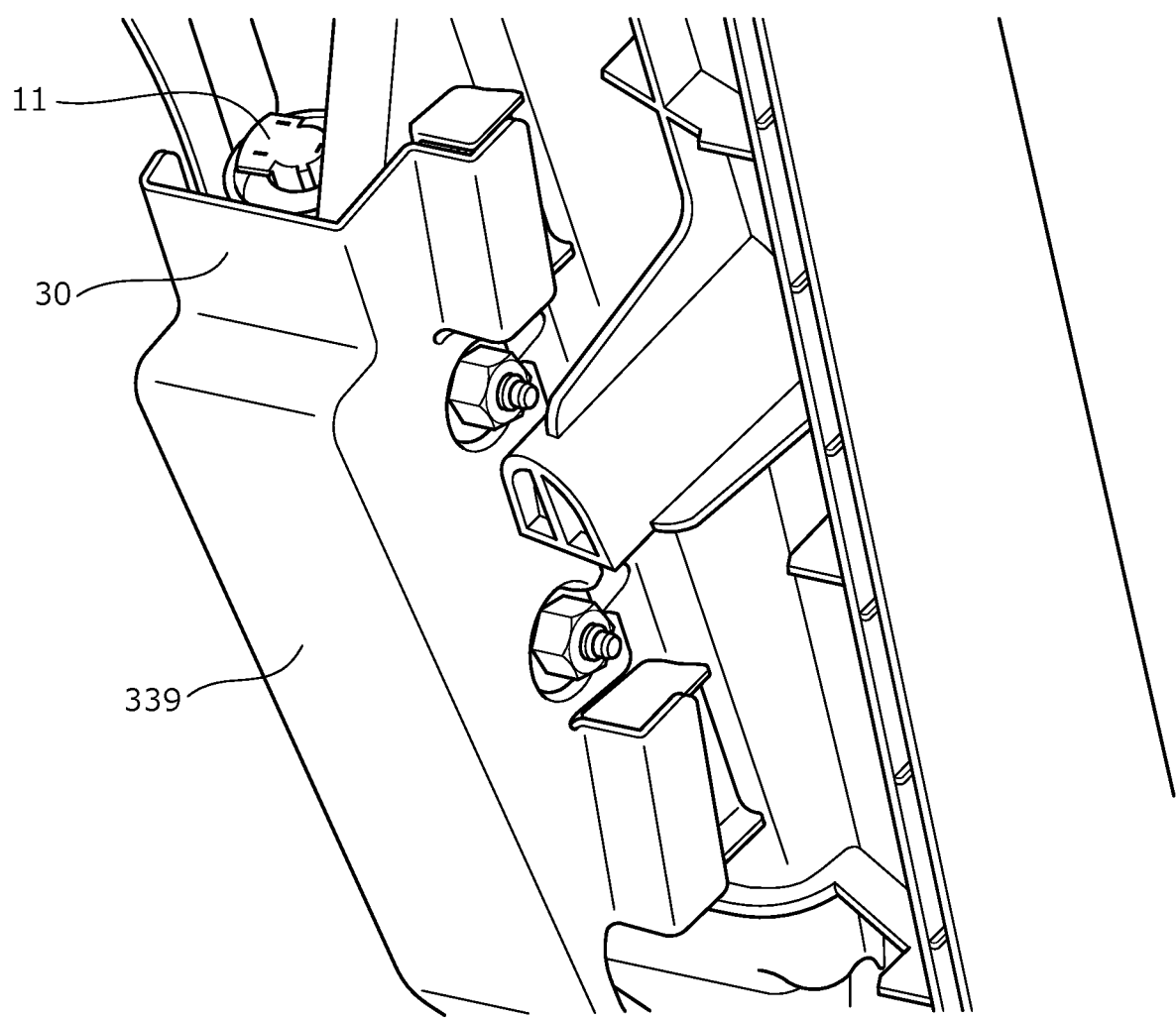
FIG. 15 is a perspective drawing illustrating still another modified example of the retainer member of FIG. 5, according to an embodiment.

In another example, as illustrated in FIG. 15, a protrusion 339 elongated in the up-to-down direction and conforming to the shape of the inflator 11 may be provided integrally with the retainer member 30. The protrusion 339 includes a load receiving surface having an inclined surface conforming to the shape of the vehicle body member (not-shown). As described above, the protrusion 339 is formed to conform to the shape of the inflator 11 and the shape of the vehicle body member (not-shown); therefore reactive force generated at the time of expansion and deployment of the air bag 10 can be efficiently received.

Figure 16:
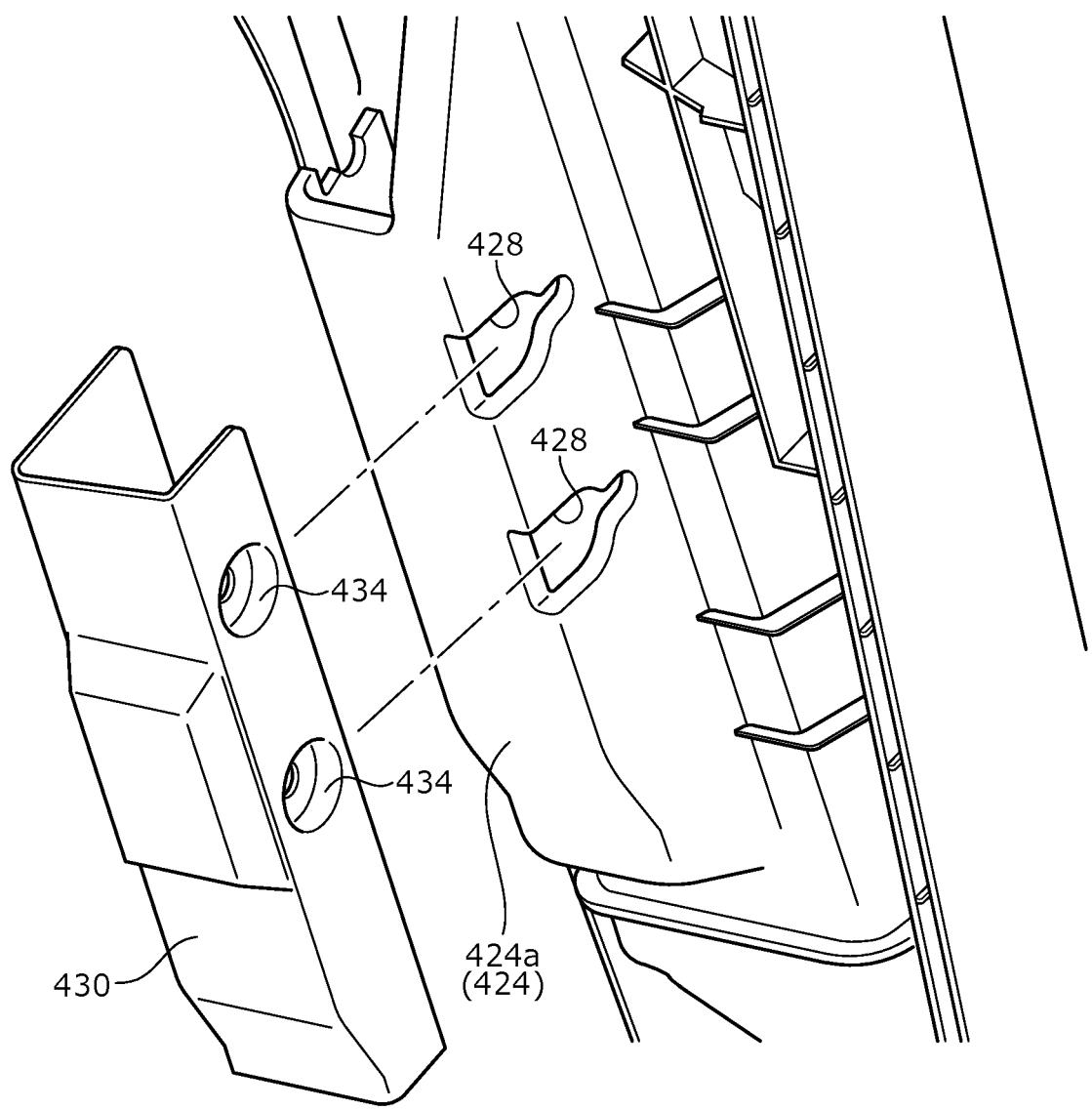
FIG. 16 is a perspective exploded drawing of another modified example of the retainer member of FIG. 5, according to an embodiment.

In an embodiment, as illustrated in FIG. 16, base holes 428 formed at a base storage 424 and used for attachment of the inflator 11 may extend further toward the vehicle back side as compared to the base holes 28 of FIG. 4, so as to subsequently reach a back wall portion 424a. With this configuration, in the case of attaching a retainer member 430 to the base storage 424 from the vehicle back side, fitting recesses 434 are fitted into the base holes 428 such that the base holes 428 are elastically deformed. As a result, attachment rigidity of the retainer member 430 is improved, and the process of attaching the retainer member 430 is facilitated.

In the above-described embodiment, as illustrated in FIG. 17, the retainer member 430 may be cut in the middle to be short in the up-to-down direction compared with the retainer member 30 of FIG. 3, and a portion of the retainer member 430 overlapping a base attachment portion 421b may remain as a second retainer piece 430f. With this configuration, the base storage 424 storing at least the air bag 10 and the inflator 11 can be held while the weight of the side air bag device S can be reduced. In addition, when the base attachment portion 421b is attached to the vehicle body member (not-shown), the second retainer made of metal can be provided in contact with the metal of the vehicle body member while being arranged between the vehicle body member and the base attachment portion 421b. Therefore, the base attachment portion 421b can be further stably attached to the vehicle body. Moreover, a virtual line L1 connecting between an upper base attachment portion 421a and the lower base attachment portion 421b, which are provided at a base member 420 for attachment to the vehicle body, may be positioned to pass at least partially through the inflator 11 and the base storage 424. With this configuration, the base member 420 can be suitably supported on the vehicle body member (not-shown) while receiving a reactive force generated at the time of expansion and deployment of the air bag 10. Further, a virtual line L2 connecting between a base protrusion 421c and the lower base attachment portion 421b, which are for contact with the vehicle body, may pass at least partially through the base storage 424. With this configuration, the base member 420 can be suitably supported on the vehicle body member while receiving reactive force generated at the time of expansion of the air bag 10.

In the above-described embodiment, as illustrated in FIG. 7, the protrusion 39 is disposed with the predetermined spacing from the vehicle body member 38. Alternatively, the protrusion 39 may be disposed in advance in contact with the vehicle body member 38.

In the above-described embodiment, at a portion of the back wall portion 24a of the base storage 24 facing the protrusion 39 of the retainer member 30, another protrusion protruding toward the vehicle back side may be formed integrally or separately. Such protrusion is preferably formed so as to conform to the shape of the protrusion 39 of the retainer member 30. With this configuration, rigidity of the periphery of the base storage 24 can be further improved, and the air bag 10 can further stably deploy in the expansion and deployment direction. In addition, with this configuration, the position of the retainer member 30 during assembly thereof may be more readily determined.

In the above-described embodiment, as illustrated in FIG. 7, the webbing lock portions 27 are formed at the inner wall portion 24c of the base storage 24, but are not limited thereto. Alternatively, the webbing lock portions 27 may be formed at the outer wall portion 24b or the back wall portion 24a of the base storage 24. Preferably, it is desirable that the webbing lock portions 27 are formed at the base storage 24 so as to be located on the vehicle inner side from the air bag 10 and the inflator 11 in the vehicle width direction. With this configuration, the webbing 70 allows more stable expansion and deployment of the air bag 10 toward the vehicle front side. This is due at least in part to one or more of the following reasons, in various embodiments. In the vehicle width direction of the base storage 24 storing the air bag 10, the outer wall portion 24b is supported by the vehicle body door 2a having a relatively-high rigidity, whereas the inner wall portion 24c is supported by the back seat 1 having a relatively-high elasticity. Thus, the air bag 10 tends to be expanded and deployed toward the back seat 1 that has the high elasticity in the vehicle width direction. Thus, the webbing lock portions 27 are provided at the inner wall portion 24c such that the air bag 10 located adjacent to the inner wall portion 24c is preferentially guided by the webbing 70; therefore the air bag 10 is stably guided in the extension and deployment direction.

In the above-described embodiment, the pad member 50 is formed as an integral body, but is not limited thereto. Alternatively, for example, the outer pad member 50a and the inner pad member 50b may be formed as separate bodies. Moreover, the pad member 50 may be placed at least on the vehicle front side from the base storage 24 of the base member 20. In this manner, as long as the pad member 50 is placed at least on the front side of the base storage 24, a vehicle front-side surface of the side air bag device S may not be partially recessed, and in addition, the side air bag device S can be formed to have a substantially flush outer surface.

In the above-described embodiment, the side air bag device S used for the automobile back seat is described as a specific example, but is not limited thereto. Alternatively, the side air bag device S may be utilized for an automobile front seat, vehicle seats of trains, buses, or the like, and passenger seats of airplanes, ships, or the like.

In the above-described embodiments, the side air bag device S of the present disclosure is mainly described. The aforementioned embodiments are merely examples for facilitating understanding of the present disclosure, and the embodiments are not intended to restrict the embodiments of the present disclosure. Changes and modifications can be made to the embodiments without departing from the scope of the invention, and it will be understood that the present disclosure encompasses equivalents thereof.

TABLE OF REFERENCE NUMERALS

S: side air bag device
1: back seat
1a: seat back
2: vehicle body
2a: vehicle body door
10: air bag
11: inflator
12: harness connection portion
13, 13a, 13b: assembly shaft
20, 320, 420: base member
21: base body
21a, 421a, 421b: base attachment portion
21d: boss
421c: base protrusion
22, 322: base outer wall portion
22a, 322a: lock claw
23: base inner wall portion
23a: insertion groove
24, 124, 224, 324, 424: base storage
24a, 124a, 424a: back wall portion
24b, 124b, 224b, 324b: outer wall portion
24c, 124c, 224c, 324c: inner wall portion
24e: opening of base member
124d: second inner wall portion
224d: second outer wall portion
25: cut portion
26a: deep recessed portion
26b: shallow recessed portion
27, 27a, 27b, 127, 227, 327: webbing lock portion
28, 428: base hole
28a: slit
29: webbing insertion hole
30, 130, 230, 330, 430: retainer member
30a, 130a, 230a, 330a, 430a: back wall portion
30b, 130b, 230b: outer wall portion (side wall portion)
30c, 130c, 230c, 330c: inner wall portion (side wall portion)
30k: fixing portion
130d: second inner wall portion
230d: second back wall portion
230e: second outer wall portion
430f: second retainer piece
31: cut portion
32, 332: webbing holding portion
33: retainer hole
33a: slit
34, 434: fitting recess
35: assembly member
38: vehicle body member
39, 139, 239, 339: protrusion
39b: side wall of protrusion
239a: front wall portion
239b: side wall portion
239c: back wall portion
40, 140, 240, 340: harness
41: upper end portion
42: lower end portion
50: pad member
50a: outer pad member 50b: inner pad member
51: pad opening
60: skin material
61: skin breakable portion
62: outer skin material
62a: other end portion
63: inner skin material
63a: other end portion
70: webbing
71: one end portion
72: other end portion
126: housing recess

The invention claimed is:

1. A side air bag device provided between a vehicle body and a back seat, comprising:
an expandable air bag;
an inflator configured to supply gas into the air bag;
a base member including a base storage, configured to store the air bag in a folded state and the inflator, the base member being attached between a vehicle body door and the back seat; and
a retainer member configured to hold the base storage from a vehicle back side;
wherein the retainer member comprises a side wall portion;
wherein a length in a front-to-rear direction of the side wall portion of a portion of the retainer member that is disposed in a rear of the base storage is larger than a length in the front-to-rear direction of the side wall portion of a lower portion of the retainer member;
wherein the side wall portion of the retainer member is disposed at a side of a boss provided in the base member;
wherein the retainer member comprises a fixing portion that is provided in the lower portion of the retainer member and fixed to the base member, and a protrusion that is provided on a back wall portion of the retainer member and has a side wall.

2. The side air bag device according to claim 1, wherein:
the retainer member comprises a curved portion that is concaved so that a frontmost surface of the curved portion is a bottom surface of a concave shape of the curved portion, and
the curved portion of the retainer member is arranged below a center of the retainer member in an up-to-down direction.

3. The side air bag device according to claim 1 wherein a lower end of the retainer member is arranged below a lower end of the base member in an up-to-down direction.

4. The side air bag device according to claim 1, wherein:
the retainer member comprises a curved portion that is concaved so that a frontmost surface of the curved portion is a bottom surface of a concave shape of the curved portion, and
the curved portion of the retainer member covers a part of the base storage from a back side.

5. The side air bag device according to claim 4, wherein:
the base storage comprises a deep recessed portion that is recessed toward a vehicle back side and a shallow recessed portion that is less recessed toward the vehicle back side than the deep recessed portion,
the retainer member comprises a curved portion that is concaved so that a frontmost surface of the curved portion is a bottom surface of a concave shape of the curved portion, and
the curved portion of the retainer member overlaps a portion of the shallow recessed portion in the base storage in the front-to-rear direction.

6. The side air bag device according to claim 1, wherein:
an opening is provided on a back side of the base member,
the side wall portion of the retainer member is a first side wall portion and the retainer member further comprise a second side wall portion, and
the first side wall portion and the second side wall portion are arranged respectively on both sides of the opening.

7. A side air bag device provided between a vehicle body and a back seat, comprising:
an expandable air bag;
an inflator configured to supply gas into the air bag;
a base member including a base storage, configured to store the air bag in a folded state and the inflator, the base member being attached between a vehicle body door and the back seat; and
a retainer member configured to hold the base storage from a vehicle back side;
wherein:
the retainer member comprises a side wall portion;
a length in a front-to-rear direction of the side wall portion of a portion of the retainer member that is disposed in a rear of the base storage is larger than a length in the front-to-rear direction of the side wall portion of a lower portion of the retainer member;
the retainer member is formed from a single member;
an opening is provided on a back side of the base member,
the side wall portion of the retainer member is a first side wall portion and the retainer member further comprise a second side wall portion, and
the first side wall portion and the second side wall portion are arranged respectively on both sides of the opening.

8. The side air bag device according to claim 7, wherein:
the retainer member comprises a curved portion that is concaved so that a frontmost surface of the curved portion is a bottom surface of a concave shape of the curved portion, and
the curved portion of the retainer member is arranged below a center of the retainer member in an up-to-down direction.

9. The side air bag device according to claim 7, wherein a lower end of the retainer member is arranged below a lower end of the base member in an up-to-down direction.

10. The side air bag device according to claim 7, wherein:
the retainer member comprises a curved portion that is concaved so that a frontmost surface of the curved portion is a bottom surface of a concave shape of the curved portion, and
the curved portion of the retainer member covers a part of the base storage from a back side.

11. The side air bag device according to claim 7, wherein:
the retainer member comprises a curved portion that is provided in the lower portion of the retainer member and concaved so that a frontmost surface of the curved portion is a bottom surface of a concave shape of the curved portion, and
the length in the front-to-rear direction of the side wall portion of the portion of the retainer member that is disposed in the rear of the base storage is larger than a length in the front-to-rear direction of the side wall portion of the curved portion of the retainer member.

12. The side air bag device according to claim 7, wherein:
the retainer member comprises a fixing portion that is provided in the lower portion of the retainer member and fixed to the base member, and the length in the front-to-rear direction of the side wall portion of the portion of the retainer member that is disposed in the rear of the base storage is larger than a length in the front-to-rear direction of the side wall portion of the fixing portion of the retainer member.

13. The side air bag device according to claim 7, wherein:
the retainer member comprises a fixing portion that is provided in the lower portion of the retainer member and fixed to the base member, and a protrusion that is provided on a back wall portion of the retainer member and has a side wall, and
a length in the front-to-rear direction of the side wall of the protrusion is larger than a length in the front-to-rear direction of the side wall portion of the fixing portion of the retainer member.

14. The side air bag device according to claim 7, wherein:
the base storage comprises a deep recessed portion that is recessed toward a vehicle back side and a shallow recessed portion that is less recessed toward the vehicle back side than the deep recessed portion,
the retainer member comprises a curved portion that is concaved so that a frontmost surface of the curved portion is a bottom surface of a concave shape of the curved portion, and
the curved portion of the retainer member overlaps a portion of the shallow recessed portion in the base storage in the front-to-rear direction.

15. A side air bag device provided between a vehicle body and a back seat, comprising:
an expandable air bag;
an inflator configured to supply gas into the air bag;
a base member including a base storage, configured to store the air bag in a folded state and the inflator, the base member being attached between a vehicle body door and the back seat; and
a retainer member configured to hold the base storage from a vehicle back side;
wherein:
the retainer member comprises a side wall portion;
a length in a front-to-rear direction of the side wall portion of a portion of the retainer member that is disposed in a rear of the base storage is larger than a length in the front-to-rear direction of the side wall portion of a lower portion of the retainer member; and
the side air bag device is configured to be arranged at a side of a seat back of the back seat;
wherein:
the base storage comprises a deep recessed portion that is recessed toward a vehicle back side and a shallow recessed portion that is less recessed toward the vehicle back side than the deep recessed portion,
the retainer member comprises a curved portion that is concaved so that a frontmost surface of the curved portion is a bottom surface of a concave shape of the curved portion, and
the curved portion of the retainer member overlaps a portion of the shallow recessed portion in the base storage in the front-to-rear direction.

16. The side air bag device according to claim 15, wherein:
the retainer member comprises a curved portion that is provided in the lower portion of the retainer member and concaved so that a frontmost surface of the curved portion is a bottom surface of a concave shape of the curved portion, and
the length in the front-to-rear direction of the side wall portion of the portion of the retainer member that is disposed in the rear of the base storage is larger than a length in the front-to-rear direction of the side wall portion of the curved portion of the retainer member.

17. The side air bag device according to claim 15, wherein:
the retainer member comprises a fixing portion that is provided in the lower portion of the retainer member and fixed to the base member, and
the length in the front-to-rear direction of the side wall portion of the portion of the retainer member that is disposed in the rear of the base storage is larger than a length in the front-to-rear direction of the side wall portion of the fixing portion of the retainer member.

18. The side air bag device according to claim 15, wherein:
the retainer member comprises a fixing portion that is provided in the lower portion of the retainer member and fixed to the base member, and a protrusion that is provided on a back wall portion of the retainer member and has a side wall, and
a length in the front-to-rear direction of the side wall of the protrusion is larger than a length in the front-to-rear direction of the side wall portion of the fixing portion of the retainer member.

19. The side air bag device according to claim 15, wherein:
an opening is provided on a back side of the base member,
the side wall portion of the retainer member is a first side wall portion and the retainer member further comprise a second side wall portion, and
the first side wall portion and the second side wall portion are arranged respectively on both sides of the opening.

20. The side air bag device according to claim 15, wherein a lower end of the retainer member is arranged below a lower end of the base member in an up-to-down direction.

* * * * *